(12) United States Patent
Leung et al.

(10) Patent No.: US 7,184,789 B2
(45) Date of Patent: Feb. 27, 2007

(54) METHOD AND APPARATUS FOR DATA PACKET TRANSPORT IN A WIRELESS COMMUNICATION SYSTEM USING AN INTERNET PROTOCOL

(75) Inventors: Nikolai K. N. Leung, Takoma Park, MD (US); Nileshkumar J. Parekh, San Diego, CA (US); Raymond T. Hsu, San Diego, CA (US); An Mei Chen, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 805 days.

(21) Appl. No.: 10/011,526

(22) Filed: Nov. 5, 2001

(65) Prior Publication Data

US 2003/0087653 A1    May 8, 2003

Related U.S. Application Data

(63) Continuation-in-part of application No. 09/970,487, filed on Oct. 3, 2001.

(51) Int. Cl.
*H04B 7/00* (2006.01)

(52) U.S. Cl. ............... 455/519; 455/518; 455/66.1

(58) Field of Classification Search ............ 455/503, 455/507, 517, 518, 519, 520, 521, 416, 3.01, 455/66.1, 3.02
See application file for complete search history.

(56) References Cited

U.S. PATENT DOCUMENTS

| 4,870,408 A | * | 9/1989 | Zdunek et al. ........... 370/341 |
| 5,101,501 A | | 3/1992 | Gilhousen et al. |
| 5,325,357 A | * | 6/1994 | Kimoto et al. ........... 370/390 |
| 5,369,784 A | * | 11/1994 | Nelson .................. 455/503 |
| 5,758,291 A | * | 5/1998 | Grube et al. ............. 455/518 |
| 5,778,187 A | | 7/1998 | Monteiro et al. |
| 6,108,706 A | * | 8/2000 | Birdwell et al. ......... 709/229 |
| 6,185,430 B1 | * | 2/2001 | Yee et al. ............... 455/519 |
| 6,253,069 B1 | * | 6/2001 | Mankovitz ............. 455/186.1 |
| 6,373,829 B1 | * | 4/2002 | Vilmur .................. 370/335 |
| 6,385,461 B1 | * | 5/2002 | Raith .................... 455/518 |
| 6,449,491 B1 | * | 9/2002 | Dailey ................... 455/518 |

FOREIGN PATENT DOCUMENTS

| EP | 0 951 198 A2 | | 10/1999 |
| WO | WO 98/25422 | * | 6/1998 |
| WO | WO 99/59355 | | 11/1999 |
| WO | WO 00/13356 | | 3/2000 |
| WO | WO 00/62547 | | 10/2000 |

* cited by examiner

OTHER PUBLICATIONS

Lin et al., "A Multicast Routing Protocol for Multihop Wireless Networks," *Global Telecommunications Conference*, XP010373304, Taiwan, 235-239, 1999.

*Primary Examiner*—Tilahun Gesesse
(74) *Attorney, Agent, or Firm*—Philip R. Wadsworth; Thien T. Nguyen; Roberta A. Young

(57) ABSTRACT

Method and apparatus for data packet transport in a wireless transmission system supporting broadcast transmissions. A trigger recognized at the transmission node initiates a broadcast transmission, and the resultant set up of a transmission path. A termination trigger then indicates that the transmission node is not serving users desiring the broadcast transmission, and in response the transmission path is shut down. In one embodiment, a multi-cast call, such as a group call, may be transmitted to active users via uni-cast channel(s) or multi-cast channel(s) based on a predetermined criteria, such as number of active users.

14 Claims, 17 Drawing Sheets

METHOD AND APPARATUS FOR DATA PACKET TRANSPORT IN A WIRELESS COMMUNICATION SYSTEM USING AN INTERNET PROTOCOL

CLAIM OF PRIORITY UNDER 35 U.S.C. 120

The present Application for Patent is a Continuation-in-Part of and claims priority to patent application Ser. No. 09/970,487 entitled "Method and Apparatus for Data Packet Transport in a Wireless Communication System Using an Internet Protocol" filed Oct. 3, 2001, assigned to the assignee hereof and hereby expressly incorporated by reference.

REFERENCE TO CO-PENDING APPLICATIONS FOR PATENT

The present invention is related to the following applications for patent in the U.S. Patent & Trademark Office:

"Method and Apparatus for Data Transport in a Wireless Communication System" by Raymond Hsu, having U.S. application Ser. No. 09/933,977, filed Aug. 20, 2001, assigned to the assignee hereof, and which is expressly incorporated by reference herein.

BACKGROUND

1. Field

The present invention relates to wireless communication systems generally and specifically, to methods and apparatus for message compression in preparation for transmission in a wireless communication system.

2. Background

There is an increasing demand for packetized data services over wireless communication systems. As traditional wireless communication systems are designed for voice communications, the extension to support data services introduces many challenges. The conservation of bandwidth is the overwhelming concern for most designers. In uni-direction transmissions, such as broadcast transmissions, a single broadcast content is provided to multiple users. The users are identified by a unique identifier, which is then included in addressing information. In such a system, multiple infrastructure elements may be required to duplicate the broadcast packets so as to identify each of the multiple intended receivers. The duplication of transmission signals uses up valuable bandwidth thus reducing the efficiency of the communication system, and increases the processing requirements of intermediate infrastructure elements. For a broadcast service in particular, the number of target recipients may be prohibitively large, thus creating problems of resource allocation and loss of available bandwidth.

There is a need, therefore, for an efficient and accurate method of transmitting data to multiple recipients in a wireless communication system. Further, there is a need for a method of routing broadcast data to multiple users, wherein each user is uniquely identified as a target recipient.

SUMMARY

Embodiments disclosed herein address the above stated needs by providing a method for routing IP packets in a wireless communication system, wherein a broadcast or other point to multi-point service is provided intermittently. The intermittent broadcast service is transmitted when a trigger is recognized to initiate the service and is not transmitted when a termination trigger is recognized. In this way, the intermittent broadcast service conserves bandwidth and other transmission resources of the system. In one embodiment, transmission over the air interface to mobile stations and/or other wireless apparatus may involve a uni-cast transmission path or a multi-cast transmission path. When the number of active users for a group call at a given transmission node exceeds a threshold, the call is transmitted over a common channel, such a broadcast channel. When the number of active users is within the threshold, the call is transmitted over a dedicated channels to each participant serviced by that transmission node. In one embodiment, packets are routed to the Access Network using a multi-cast address.

In one aspect, in a wireless communication system supporting broadcast transmissions, the system having a broadcast source node and at least one broadcast transmission node, a method includes recognizing a broadcast trigger at the broadcast transmission node, establishing a broadcast transmission path to the broadcast transmission node from the broadcast source node, sending a broadcast message through the broadcast transmission path to the broadcast transmission node, and transmitting the broadcast message from the broadcast transmission node.

In another aspect, a wireless apparatus includes a processing unit, a memory storage device coupled to the processing unit, the memory storage device adapted to store a plurality of instructions for: (1) recognizing a broadcast trigger at the broadcast transmission node; (2) establishing a broadcast transmission path to the broadcast transmission node from the broadcast source node; (3) sending a broadcast message through the broadcast transmission path to the broadcast transmission node; and (4) transmitting the broadcast message from the broadcast transmission node.

In still another aspect, in a wireless communication system supporting group call transmissions, the system having a source node and at least one transmission node, a method includes initiating a first group call, determining a first number of active users for the group call, if the first number exceeds a threshold value, transmitting the group call on a broadcast channel, and if the first number does not exceed the threshold value, transmitting the group call on at least one dedicated channel, wherein the at least one dedicated channel allows a point-to-point communication between the at least one transmission node and an active user.

DETAILED DESCRIPTION

Figure 1:
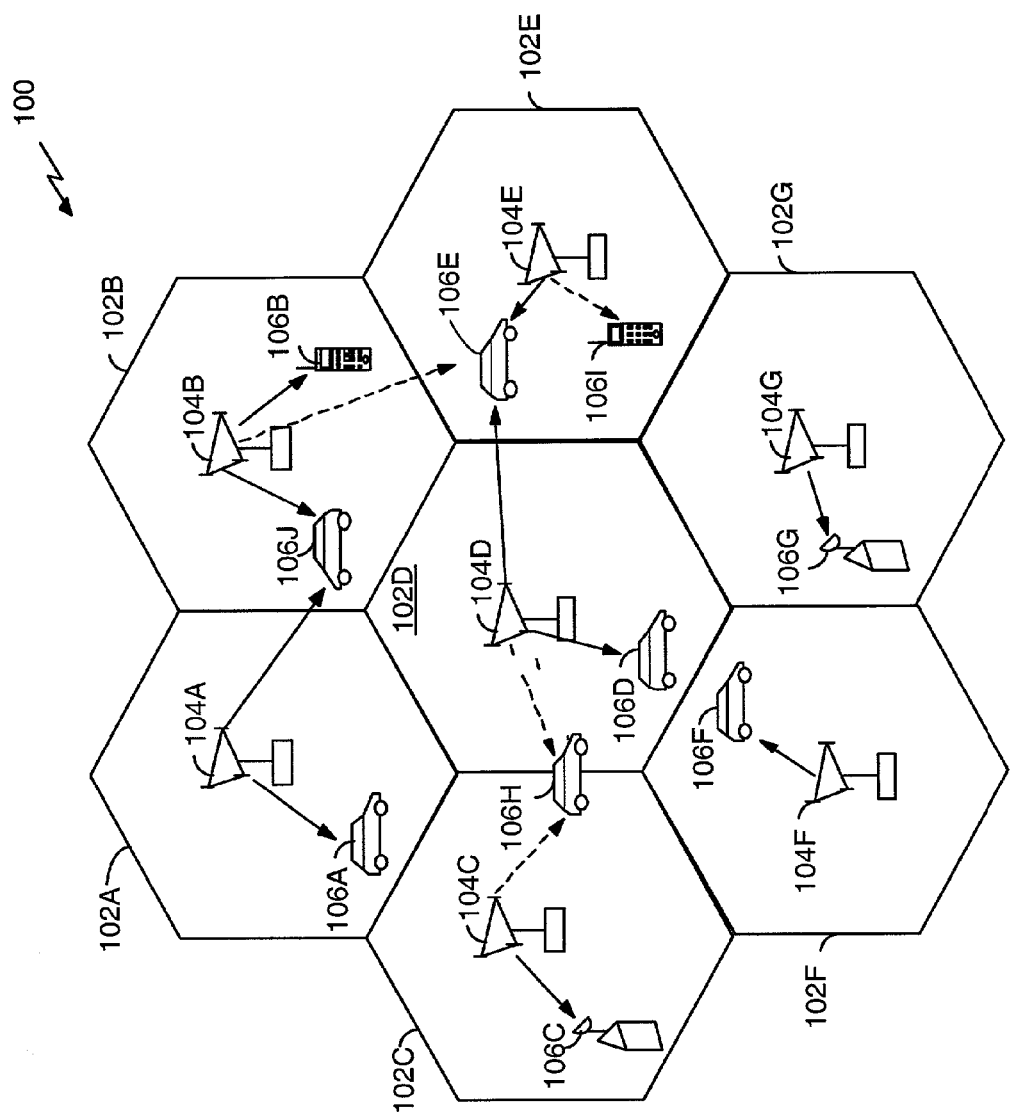
FIG. 1 is a diagram of a spread spectrum communication system that supports a number of users.

The word "exemplary" is used exclusively herein to mean "serving as an example, instance, or illustration." Any embodiment described herein as "exemplary" is not necessarily to be construed as preferred or advantageous over other embodiments.

The efficient use of available bandwidth impacts the performance and breadth of the system. Toward that end, various techniques have been applied to reduce the size of overhead information transmitted along with the data or content information. For example, in a digital transmission, data is transmitted in frames. A frame of information typically includes header information, data payload information, and a tail portion. The frames may be part of a packet of data, part of a data message, or continuous frames in a stream of information, such as audio and/or video streams. Attached to each frame of data (and each packet or message) is a header containing processing information that allows the receiver to understand the information contained in the frame(s). This header information is considered overhead, i.e., processing information transmitted along with information content. The information content is referred to as the payload.

The data frames are transmitted throughout the communication system via various infrastructure elements. In a conventional system, the transmission of information to multiple users requires the duplication of the information at a central packet data control point, such as a Packet Data Service Node (PDSN). The duplication increases the processing requirements of the PDSN and wastes valuable bandwidth. For example, expansion of a given system may require routers and trunks proximate a PDSN be sized sufficiently to handle the duplicated traffic. The PDSN transmits the multiple copies to the base stations, which forward the information to each user. The conventional approach is particularly disadvantageous in a unidirectional broadcast service, wherein many users are receiving the broadcast transmission. The PDSN in this case must make a great number of copies, apply a specific address to each copy and transmit the copies individually.

The PDSN is typically required to provide additional header information identifying each target recipient. For a broadcast service, the number of target recipients may be prohibitively large, thus creating problems of resource allocation and loss of available bandwidth.

An exemplary embodiment of a wireless communication system employs a method of data transport that reduces the bandwidth used by the infrastructure elements while satisfying the accuracy and transmission requirements of the system. In the exemplary embodiment, duplication is performed at the BS or Packet Control Function (PCF) node, freeing the PDSN or central packet data router, to send the message with a multi-cast header to each BS or PCF involved in the broadcast. For example, a message may process through a Multi-Cast (MC) tree to a PCF, wherein the PCF duplicates the message for each BSC and then transmits each message via a distinct Uni-Cast (UC) connection, i.e., connection or secure tunnel created between the PCF and a specific BSC. Note that a UC connection may be considered a point-to-point connection. The exemplary embodiment supports a unidirectional broadcast service. The broadcast service provides video and/or audio streams to multiple users. Subscribers to the broadcast service "tune in" to a designated channel to access the broadcast transmission. As the bandwidth requirement for high speed transmission of video broadcasts is great, it is desirable to reduce the amount of duplication and transmission of duplicate packets over the hops in the network.

The following discussion develops the exemplary embodiment by first presenting a spread-spectrum wireless communication system generally. Next, the broadcast service is introduced; wherein the service is referred to as High Speed Broadcast Service (HSBS), and the discussion includes channel assignments of the exemplary embodiment. A subscription model is then presented including options for paid subscriptions, free subscriptions, and hybrid subscription plans, similar to those currently available for television transmissions. The specifics of accessing the broadcast service are then detailed, presenting the use of a service option to define the specifics of a given transmission. The message flow in the broadcast system is discussed with respect to the topology of the system, i.e., infrastructure elements. Finally, the header compression used in the exemplary embodiment is discussed Note that the exemplary embodiment is provided as an exemplar throughout this discussion; however, alternate embodiments may incorporate various aspects without departing from the scope of the present invention. Specifically, the present invention is applicable to a data processing system, a wireless communication system; a unidirectional broadcast system, and any other system desiring efficient transmission of information.

Wireless Communication System

The exemplary embodiment employs a spread-spectrum wireless communication system, supporting a broadcast service. Wireless communication systems are widely deployed to provide various types of communication such as voice, data, and so on. These systems may be based on code division multiple access (CDMA), time division multiple access (TDMA), or some other modulation techniques. A CDMA system provides certain advantages over other types of system, including increased system capacity.

A system may be designed to support one or more standards such as the "TIA/EIA/IS-95-B Mobile Station-Base Station Compatibility Standard for Dual-Mode Wideband Spread Spectrum Cellular System" referred to herein as the IS-95 standard, the standard offered by a consortium named "3rd Generation Partnership Project" referred to herein as 3GPP, and embodied in a set of documents including Document Nos. 3G TS 25.211, 3G TS 25.212, 3G TS 25.213, and 3G TS 25.214, 3G TS 25.302, referred to herein as the W-CDMA standard, the standard offered by a consortium named "3rd Generation Partnership Project 2" referred to herein as 3GPP2, and TR-45.5 referred to herein as the cdma2000 standard, formerly called IS-2000 MC. The standards cited hereinabove are hereby expressly incorporated herein by reference.

Each standard specifically defines the processing of data for transmission from base station to mobile, and vice versa. As an exemplary embodiment the following discussion considers a spread-spectrum communication system consistent with the cdma200 standard of protocols. Alternate embodiments may incorporate another standard. Still other embodiments may apply the compression methods disclosed herein to other types of data processing systems.

FIG. 1 serves as an example of a communications system 100 that supports a number of users and is capable of implementing at least some aspects and embodiments of the invention. Any of a variety of algorithms and methods may be used to schedule transmissions in system 100. System 100 provides communication for a number of cells 102A through 102G, each of which is serviced by a corresponding base station 104A through 104G, respectively. In the exemplary embodiment, some of base stations 104 have multiple receive antennas and others have only one receive antenna. Similarly, some of base stations 104 have multiple transmit antennas, and others have single transmit antennas. There are no restrictions on the combinations of transmit antennas and receive antennas. Therefore, it is possible for a base station 104 to have multiple transmit antennas and a single receive antenna, or to have multiple receive antennas and a single transmit antenna, or to have both single or multiple transmit and receive antennas.

Terminals 106 in the coverage area may be fixed (i.e., stationary) or mobile. As shown in FIG. 1, various terminals 106 are dispersed throughout the system. Each terminal 106 communicates with at least one and possibly more base stations 104 on the downlink and uplink at any given moment depending on, for example, whether soft handoff is employed or whether the terminal is designed and operated to (concurrently or sequentially) receive multiple transmissions from multiple base stations. Soft handoff in CDMA communications systems is well known in the art and is described in detail in U.S. Pat. No. 5,101,501, entitled "Method and system for providing a Soft Handoff in a CDMA Cellular Telephone System", which is assigned to the assignee of the present invention.

The downlink refers to transmission from the base station to the terminal, and the uplink refers to transmission from the terminal to the base station. In the exemplary embodiment, some of terminals 106 have multiple receive antennas and others have only one receive antenna. In FIG. 1, base station 104A transmits data to terminals 106A and 106J on the downlink, base station 104B transmits data to terminals 106B and 106J, base station 104C transmits data to terminal 106C, and so on.

Increasing demand for wireless data transmission and the expansion of services available via wireless communication technology have led to the development of specific data services. One such service is referred to as High Data Rate (HDR). An exemplary HDR service is proposed in "EIA/TIA-IS856 cdma2000 High Rate Packet Data Air Interface Specification" referred to as "the HDR specification." HDR service is generally an overlay to a voice communication system that provides an efficient method of transmitting packets of data in a wireless communication system. As the amount of data transmitted and the number of transmissions increases, the limited bandwidth available for radio transmissions becomes a critical resource. There is a need, therefore, for an efficient and fair method of scheduling transmissions in a communication system that optimizes use of available bandwidth. In the exemplary embodiment, system 100 illustrated in FIG. 1 is consistent with a CDMA type system having HDR service.

High Speed Broadcast System (HSBS)

Figure 2:
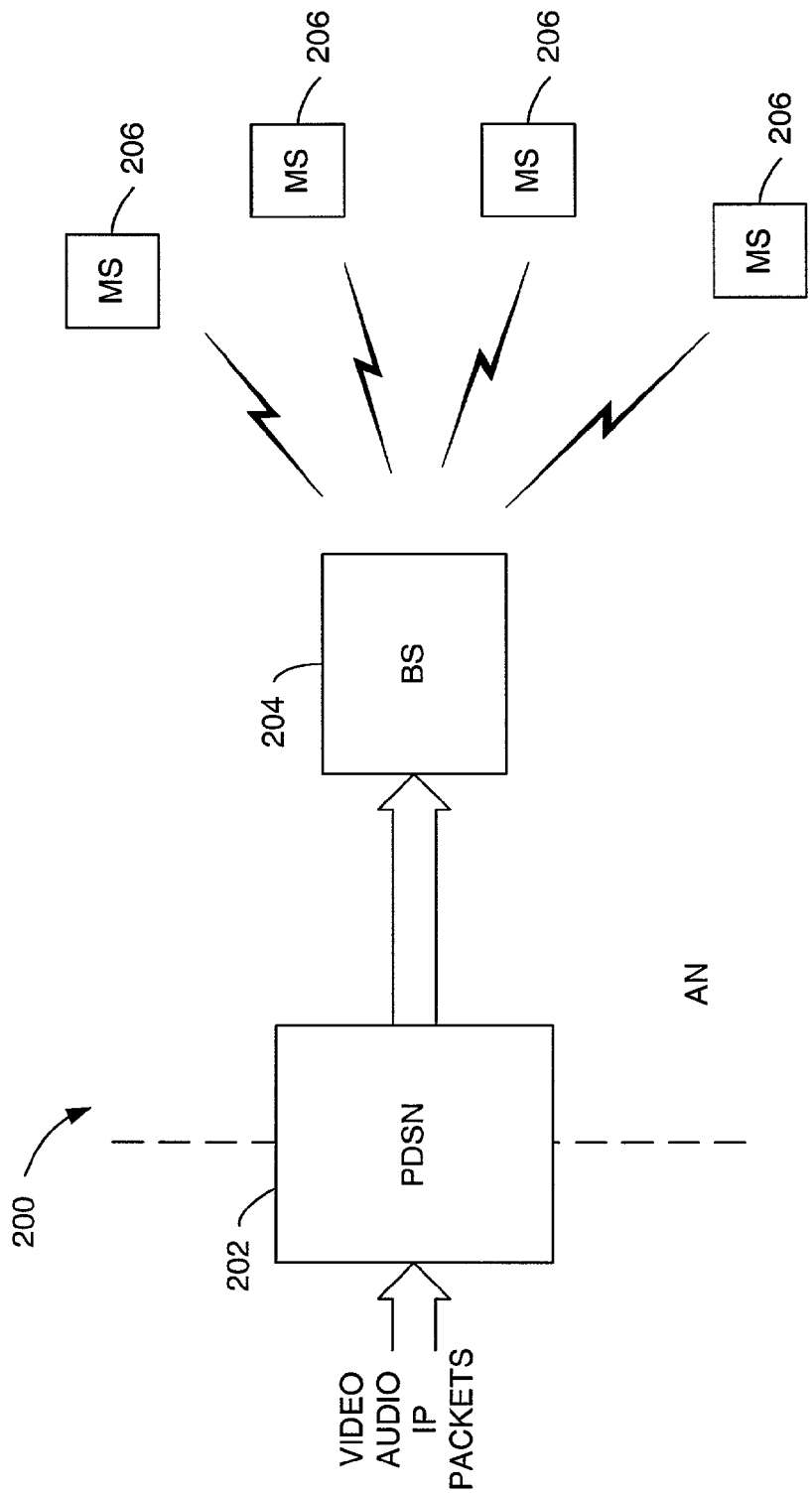
FIG. 2 is a block diagram of the communication system supporting broadcast transmissions.

A wireless communication system 200 is illustrated in FIG. 2, wherein video and audio information is provided to Packet Data Service Node (PDSN) 202. The video and audio information may be from televised programming or a radio transmission. The information is provided as packetized data, such as in IP packets. The PDSN 202 processes the IP packets for distribution within an Access Network (AN). As illustrated the AN is defined as the portions of the system including a BS 204 in communication with multiple MS 206. The PDSN 202 is coupled to the BS 204. For HSBS service, the BS 204 receives the stream of information from the PDSN 202 and provides the information on a designated channel to subscribers within the system 200.

In a given sector, there are several ways in which the HSBS broadcast service may be deployed. The factors involved in designing a system include, but are not limited to, the number of HSBS sessions supported, the number of frequency assignments, and the number of broadcast physical channels supported.

The HSBS is a stream of information provided over an air interface in a wireless communication system. The "HSBS channel" to refer to a single logical HSBS broadcast session as defined by broadcast content. Note that the content of a given HSBS channel may change with time, e.g., 7 am News, 8 am Weather, 9 am Movies, etc. The time based scheduling is analogous to a single TV channel. The "Broadcast channel" refers to a single forward link physical channel, i.e., a given Walsh Code that carries broadcast traffic. The Broadcast Channel, BCH, corresponds to a single Code Division Multiplex (CDM) channel.

A single broadcast channel can carry one or more HSBS channels; in this case, the HSBS channels will be multiplexed in a Time-Division Multiplex (TDM) fashion within the single broadcast channel. In one embodiment, a single HSBS channel is provided on more than one broadcast channel within a sector. In another embodiment, a single HSBS channel is provided on different frequencies to serve subscribers in those frequencies.

According to the exemplary embodiment, the system 100 illustrated in FIG. 1 supports a high-speed multimedia broadcasting service referred to as High-Speed Broadcast Service (HSBS). The broadcast capabilities of the service are intended to provide programming at a data rate sufficient to support video and audio communications. As an example, applications of the HSBS may include video streaming of movies, sports events, etc. The HSBS service is a packet data service based on the Internet Protocol (IP).

According to the exemplary embodiment, a Content Server (CS) advertises the availability of such high-speed broadcast service to the system users. Any user desiring to receive the HSBS service may subscribe with the CS. The subscriber is then able to scan the broadcast service schedule in a variety of ways that may be provided by the CS. For example, the broadcast schedule may be communicated through advertisements, Short Management System (SMS) messages, Wireless Application Protocol (WAP), and/or some other means generally consistent with and convenient for mobile wireless communications. Mobile users are referred to as Mobile Stations (MSs). Base Stations (BSs) transmit HSBS related parameters in overhead messages, such as those transmitted on channels and/or frequencies designated for control and information, i.e., non-payload messages. Payload refers to the information content of the transmission, wherein for a broadcast session the payload is the broadcast content, i.e., the video program, etc. When a broadcast service subscriber desires to receive a broadcast session, i.e., a particular broadcast scheduled program, the MS reads the overhead messages and learns the appropriate configurations. The MS then tunes to the frequency containing the HSBS channel, and receives the broadcast service content.

The channel structure of the exemplary embodiment is consistent with the cdma2000 standard, wherein the Forward Supplemental Channel (F-SCH) supports data transmissions. One embodiment bundles a large number of the Forward Fundamental Channels (F-FCHs) or the Forward Dedicated Control Channels (F-DCCHs) to achieve the higher data rate requirements of data services. The exemplary embodiment utilizes an F-SCH as the basis for the F-BSCH supporting a payload of 64 kbps (excluding RTP overhead). The F-BSCH may also be modified to support other payload rates, for example, by subdividing the 64-kbps payload rate into sub-streams of lower rates.

One embodiment also supports One-to-Many (1-to-M) multi-cast applications, including but not limited to group calls, in several different ways. For example, by using existing uni-cast channels, i.e., one forward link channel per MS with no sharing, of F-FCH (or the F-DCCH) on both forward and reverse links. In another example, the F-SCH (shared by group members in the same sector) and the F-DCCH (no frames but the Forward Power Control Subchannel most of the time) on the forward link and the R-DCCH on the reverse link are applied. In still another example, the high-rate F-BSCH on the forward link and the Access Channel (or the Enhanced Access Channel/Reverse Common Control Channel combination) on the reverse link is utilized.

Having a high data rate, the Forward Broadcast Supplemental CHannel (F-BSCH) of the exemplary embodiment may use a very large portion of a base station's forward link power to provide adequate coverage. The physical layer design of HSBC is thus focused on efficiency improvements in a broadcast environment.

To provide adequate support for video services, system design considers the required base station power for various ways to transmit the channel as well as the corresponding video quality. One aspect of the design is a subjective trade-off between the perceived video quality at the edge of coverage and that close to the cell site. As the payload rate is reduced, the effective error correcting code rate is increased, a given level of base station transmit power would provide better coverage at the edge of the cell. For mobile stations located closer to the base stations, the reception of the channel remains error-free and the video quality would be lowered due to the lowered source rate. This same trade-off also applies to other, non-video applications that the F-BSCH can support. Lowering the payload rate supported by the channel increases the coverage at the expense of decreased download speed for these applications. The balancing the relative importance between video quality and data throughput versus coverage is objective. The configuration chosen seeks an application-specific optimized configuration, and a good compromise among all possibilities.

The payload rate for the F-BSCH is an important design parameter. The following assumptions may be used in designing a system supporting broadcast transmissions according to the exemplary embodiment: (1) the target payload rate is 64 kbps, which provides an acceptable video quality; (2) for streaming video services, the payload rate is assumed to include the 12 8-bit bytes per packet overhead of the RTP packets; (3) the average overhead for all layers between RTP and the physical layer is approximately 64, 8-bit bytes per packet plus 8 bits per F-SCH frame overhead used by the MUXPDU header.

In the exemplary embodiment, for non-video broadcast services, the maximum rate supported is 64 kbps. However, many other possible payload rates below 64 kbps are also achievable.

Subscription Models

There are several possible subscription/revenue models for HSBS service, including free access, controlled access, and partially controlled access. For free access, no subscription is needed by the to receive the service. The BS broadcasts the content without encryption and interested mobiles can receive the content. The revenue for the service provider can be generated through advertisements that may also be transmitted in the broadcast channel. For example, upcoming movie-clips can be transmitted for which the studios will pay the service provider.

For controlled access, the MS users subscribe to the service and pay the corresponding fee to receive the broadcast service. Unsubscribed users are not being able to receive the HSBS service. Controlled access can be achieved by encrypting the HSBS transmission/content so that only the subscribed users can decrypt the content. This may use over-the-air encryption key exchange procedures. This scheme provides strong security and prevents theft-of-service.

A hybrid access scheme, referred to as partial controlled access, provides the HSBS service as a subscription-based service that is encrypted with intermittent unencrypted advertisement transmissions. These advertisements may be intended to encourage subscriptions to the encrypted HSBS service. Schedule of these unencrypted segments could be known to the MS through external means.

HSBS Service Option

Figure 3:
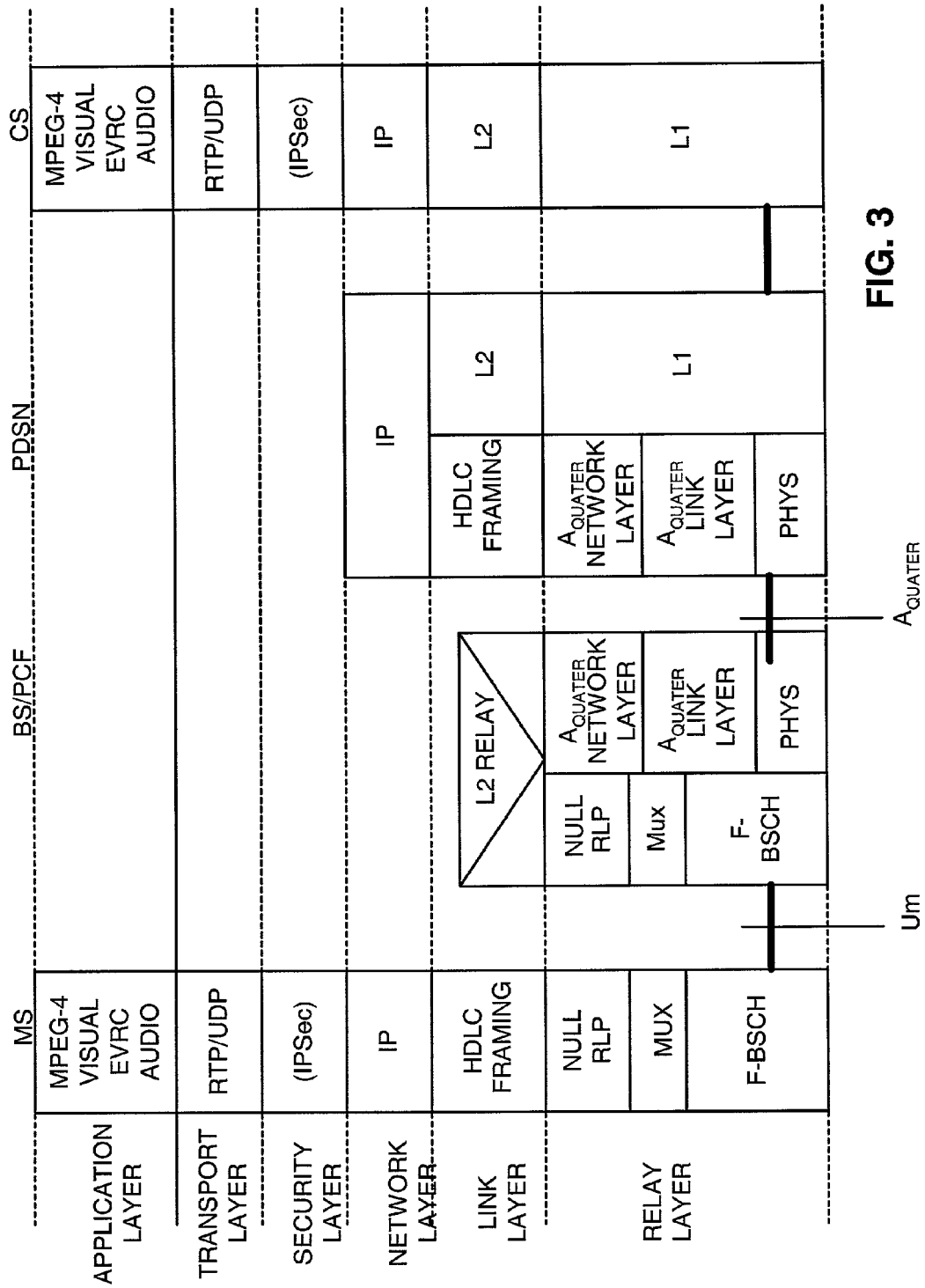
FIG. 3 is a model of the protocol stack corresponding to a broadcast service option in a wireless communication system.
Figure 4:
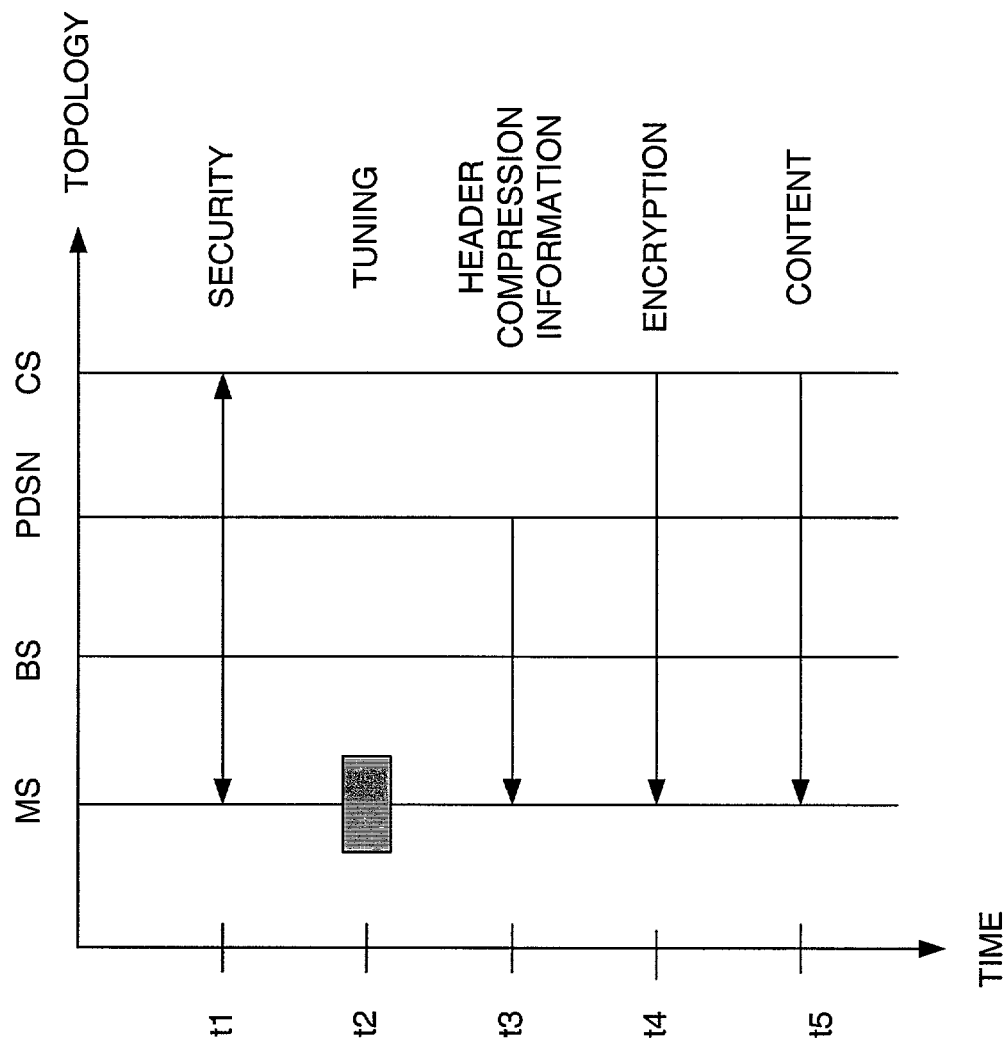
FIG. 4 is a flow diagram for a message flow for broadcast service in a wireless communication system topology.

The HSBS service option is defined by: (1) a protocol stack; (2) options in the protocol stack; and (3) procedures for setting up and synchronizing the service. The protocol stack according to the exemplary embodiment is illustrated in FIGS. 3 and 4. As illustrated in FIG. 3, the protocol stack is specific to the infrastructure element, i.e., MS, BS, PDSN and CS in the exemplary embodiment.

Continuing with FIG. 3, for the application layer of the MS, the protocol specifies audio codec, visual codec, as well as any visual profiles. Additionally, the protocol specifies Radio Transport Protocol (RTP) payload types when RTP is used. For the transport layer of the MS, the protocol specifies a User Datagram Protocol (UDP) port. The security layer of the MS is specified by the protocol, wherein security parameters are provided via out-of-band channels when the security is initially associated with the CS. The network layer specifies the IP header compression parameters. According to one embodiment, at the link layer, data packets are compressed and then an appropriate framing protocol is applied to the compressed data.

Message Flow

FIG. 4 illustrates the call flow of one embodiment for a given system topology. The system includes a MS, BS, PDSN and CS, as listed on the horizontal axis. The vertical axis represents the time. The user or MS is a subscriber to the HSBS service. At time t1 the MS and CS negotiate the subscription security for the broadcast service. Negotiation involves exchange and maintenance of encryption keys, etc., used for receiving the broadcast content on the broadcast channel. The user establishes a security association with the CS on reception of the encryption information. The encryption information may include a Broadcast Access Key (BAK) or a key combination, etc., from the CS. According to one embodiment, the CS provides the encryption information over a dedicated channel during a packet data session, such as via PPP, WAP, or other out-of-band methods.

At time t2 the MS tunes into the broadcast channel and starts to receive packets. At this point in time, the MS is unable to process the received packets because the IP/ESP header is compressed via ROHC, and the MS's decompressor has not been initialized. The PDSN provides header compression information (detailed hereinbelow) at time t3. From the ROHC packet header, the MS detects and obtains a ROHC Initialization & Refresh (IR) packet sent periodically from the PDSN to the broadcast channel. The ROHC IR packet is used to initialize the state of decompressor in the MS, allowing it to decompress the IP/ESP header of the received packets. The MS is then able to process the IP/ESP header of the received packets, however, the MS requires further information to process the ESP payload as the payload is encrypted with a Short-term Key (SK) at the CS. The SK acts in coordination with the BAK, wherein the SK is decrypted at the receiver using the BAK. The CS provides further encryption information, such as updated key information or a current SK at time t4. Note that the CS provides this information periodically to the MS to ensure the ongoing security of the broadcast. At time t5 the MS receives the broadcast content from the CS. Note that alternate embodiments may incorporate alternate compression and decompression methods that provide efficient transmission of the header information. Additionally, alternate embodiments may implement a variety of security schemes to protect the broadcast content. Still alternate embodiments may provide a non-secure broadcast service. The MS uses the encryption information, such as the SK, to decrypt and display broadcast content.

Access Network

Figure 5:
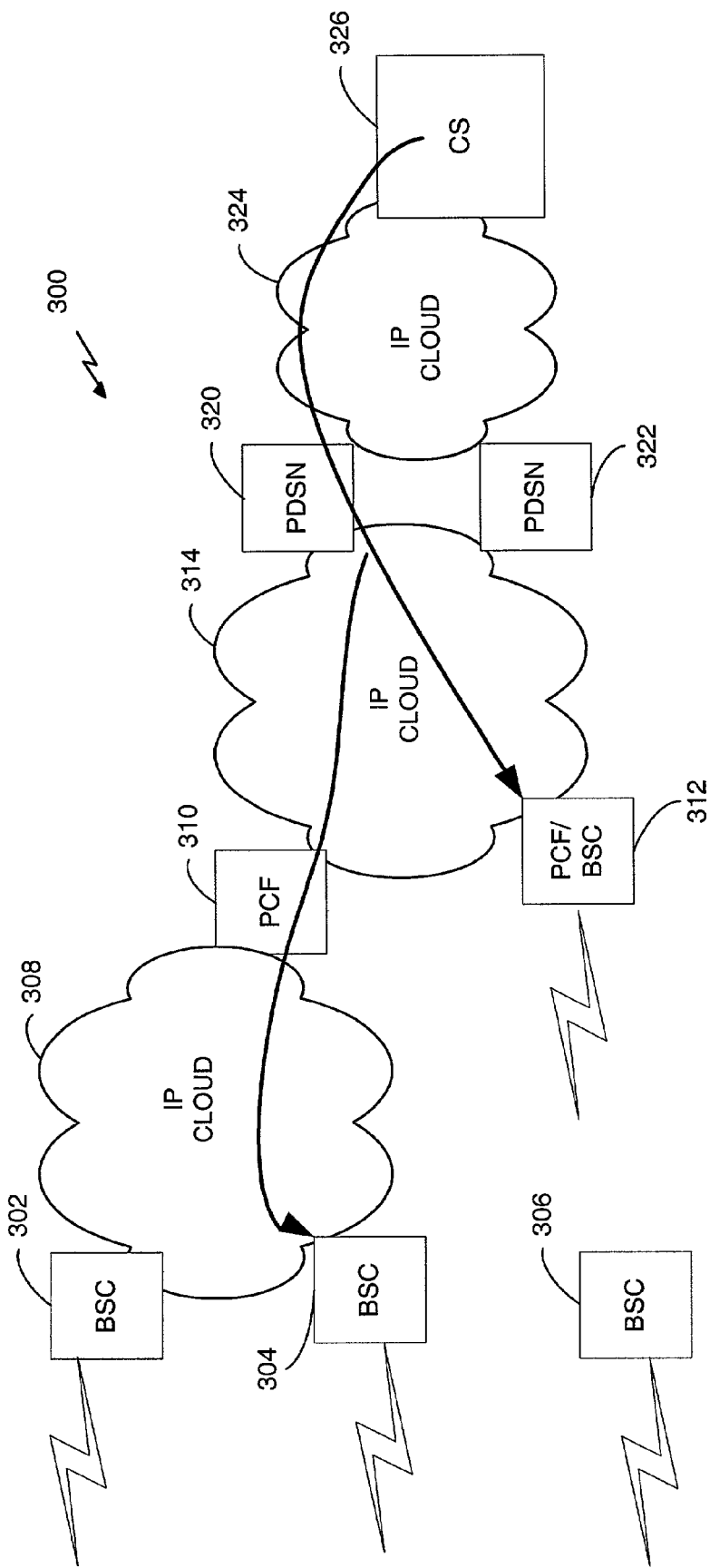
FIG. 5 is a functional diagram of a wireless communication system supporting broadcast transmission with multi-cast Internet Protocol transmission of broadcast content.

A general access network topology for a system 300 is illustrated in FIG. 5 having a CS 326, two PDSN 320, 322, a PCF 310, a co-located PCF and BSC 312, and three BSC 302, 304, 306. The CS 326 is coupled to the PDSN 320, 322 by way of an IP cloud 324. The IP cloud 324, as well as IP clouds 314 and 308 are basically a configuration of interconnected routers that form an IP path from the CS to various recipients of data from the CS. In the IP cloud 308 a virtual tunnel, referred to as an A8 tunnel, is formed for transmitting information from the PCF 310 to the BSC 302 and the BSC 304. The tunnel may be a GRE tunnel. A protocol referred to as A9 is used for establishing the A8 tunnel. The IP cloud 308 may be labeled an A8/A9 cloud. In the IP cloud 314 a virtual tunnel, referred to as an A10 tunnel, is formed for transmitting information from the PDSN 320 to each of the PCF 310 and the PCF/BSC 312. Note that an A10 tunnel is formed from PDSN 320 to PCF 310 and a second A10 tunnel is formed from PDSN 320 to PCF/BSC 312. The tunnels may be GRE tunnels. A protocol referred to as A11 is used for establishing the A10 tunnel. The IP cloud 314 may be labeled an A10/A11 cloud. One embodiment is consistent with that specified in the cdma2000 and HDR standards, described hereinabove. The Access Network (AN) is defined as the elements and connections from the PDSN to the end user, e.g., MS.

According to one embodiment, the broadcast CS 326 sends IP packets containing encrypted broadcast content to a multi-cast group identified by a class-D multi-cast IP address. This address is used in the destination address field of the IP packets. A given PDSN 320 participates in multi-cast routing of these packets. After compression, the PDSN 320 places each packet in an HDLC frame for transmission. The HDLC frame is encapsulated by a Generic Routing Encapsulation (GRE) packet. Note that the GRE encapsulation forms the A10 tunnel described hereinabove. The key field of the GRE packet header uses a special value to indicate a broadcast bearer connection. The GRE packet is appended with the 20-byte IP packet header having a source address field identifying the IP address of the PDSN 320, and destination address field uses a class-D multi-cast IP address. The multi-cast IP address is the same as the one used by the original IP packet from CS 326. The packets delivered in the broadcast connection are provided in sequence; in one embodiment the GRE sequencing feature is enabled. Duplication of the IP multi-cast packets is done in multi-cast-capable routers. Note that according to an alternate embodiment, the IP cloud 314 implements point-to-point, or uni-cast, tunnels to individual recipient PCF(s). The decision to us a multi-cast link or a uni-cast link for this connection point is made at a higher layer, wherein the UC tunnels provide increased security, and the MC tree provides efficiency.

According to an exemplary embodiment, the CS 326 transmits data to the PDSN 320 via a multi-cast IP address, wherein the PDSN 320 further transmits data to the PCF 310 and the PCF/BSC 312 also via a multi-cast IP address. The PCF 310, for example, then determines the number of individual users in the active set that are in the destination subscription group and duplicates the frame received from the CS 326 for each of those users. The PDSN PCF 310 determines the BSC(s) corresponding to each of the users in the subscription group.

In one embodiment, the BSC 304 is adapted to transmit to proximate BSC(s), wherein the BSC 304 may duplicate the received packets and send them to one or more of the neighboring BSC(s). The chaining of BSCs yields better soft handoff performance. The "anchoring" BSC method yields better soft handoff performance. The anchoring BSC 304 duplicates the transmission frame and sends it with the same time-stamp to its neighboring BSCs. The time-stamp information is critical to the soft handoff operation as the mobile station receives transmission frames from different BSCs.

Multi-Cast Service

One type of broadcast service is referred to as Multi-cast (MC) service, wherein a MC group includes those users that are participants of the MC session. The MC content is intended only for MC group. One MC service "Group Call (GC)" wherein a "GC group" includes those users that will be participants in the GC, wherein a group of users is identified for a given MC content. The group of users may be referred to as a MC group. The MC content is intended only for the MC group members. Each active user in the MC group registers with the AN. The AN then tracks the location of each registered user, and targets transmission of the MC message to these locations. Specifically, the AN determines a cell, sector, and/or geographical area within which each of the users of the MC group is located, and then transmits the message to PCFs associated with those cells, sectors, and/or geographic areas.

Figure 6:
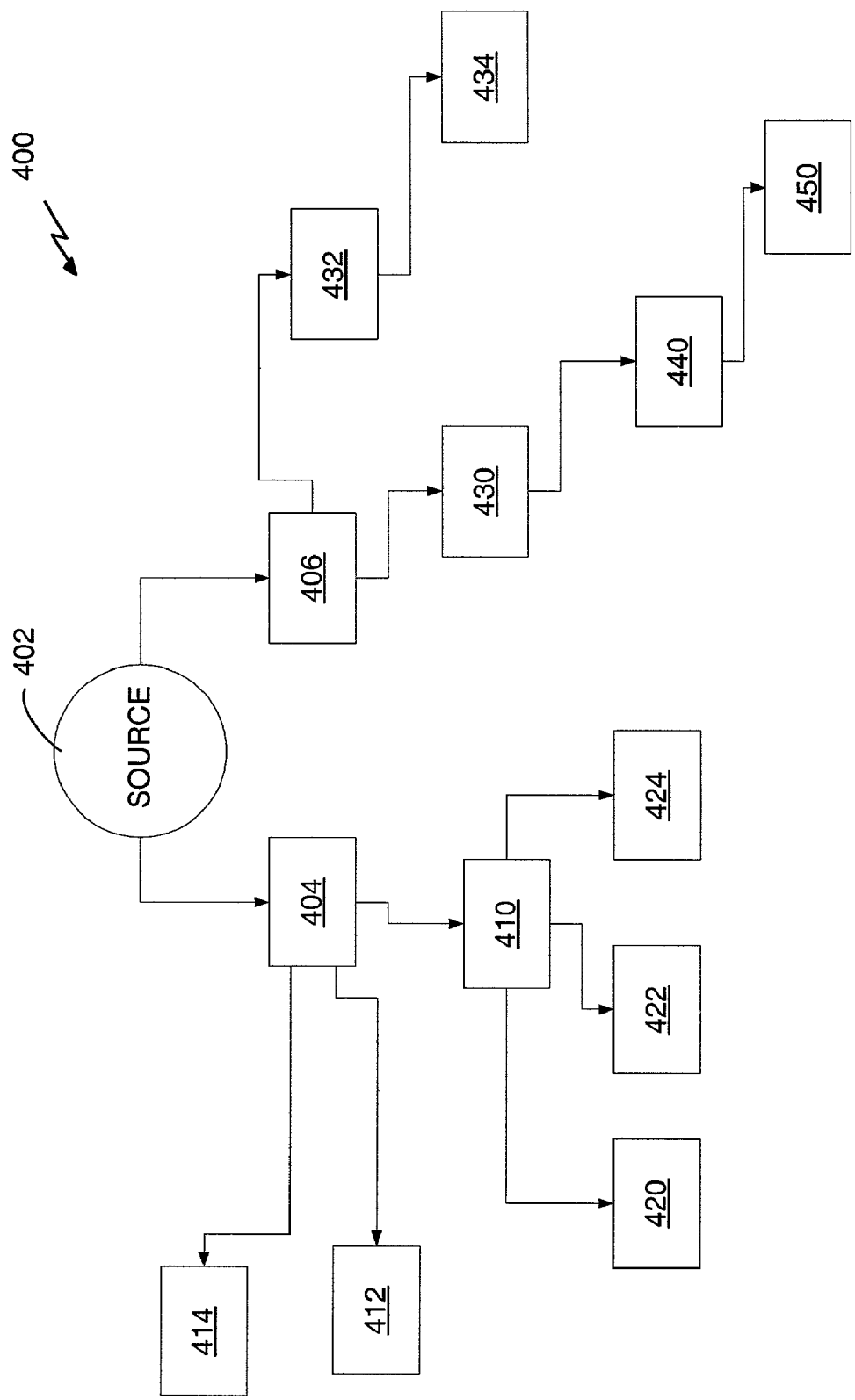
FIG. 6 is an architectural diagram of a multi-cast tree structure applicable to a communication system.

As opposed to some other type broadcast services wherein the BC message is transmitted without knowledge of the location and activity of the recipients or subscribers, the MC service operates using knowledge of the active users, specifically the location of each active user. Additionally, the users provide location information to the AN. In one embodiment the active users in an MC group register with the AN via IP communications, specifically by using an Internet Group Management Protocol (IGMP) message. As the MC service is able to identify the location of each user, and the MC targets transmission to those locations, the MC service utilizes a router between the PCF(s) and the PDSN(s). The MC service builds a tree of connections that provide a path from the CS to each PCF that is communicating with an active user in the MC group. The tree is referred to as an MC tree; an example of an MC tree is illustrated in FIG. 6 and is discussed hereinbelow.

In a conventional IP network or system, such as a computer network coupled to the Internet, if a user desires to receive MC type information, referred to as the MC content, the user registers with the nearest router using the Internet Group Management Protocol (IGMP). The router then begins the process of building a MC tree by registering with the next adjacent router. The CS then sends MC content in the form of a MC IP packet. The MC IP packet is then routed through the MC tree to the original router. This sends one copy of the data to each network interface with members registered for the MC content. A common broadcast media in a computer network is an Ethernet hub that connects multiple users to a same information stream.

The combination of the Internet and IP networks with wireless communication systems introduces several distinct problems. One problem is routing the information from the IP network through the wireless network. Several of the interconnections are predefined in a wireless system. For example, as discussed hereinabove, the interface between the BSC and PCF is defined by the A8/A9 connection. Similarly, the PCF to PDSN connection is defined by the A10/A11 connection. One embodiment forms an internal MC tree between the PDSN and PCF, and forms an external MC tree between the PDSN and the CS. The PCF then forms specific tunnels to the various BSCs that request the MC content. This embodiment, discussed hereinbelow, provides efficiency of operation. Another embodiment forms the external MC tree between the PDSN and the CS, while setting up tunnels from the PDSN to each individual PCF that is to receive the MC content. This embodiment provides secure communications.

Generally, the MC path is considered end-to-end, wherein the MC content originates at a source and is transmitted to the end user. The end user may be MS. Alternatively, the MS may be a mobile router that routes the MC content to a network. The end user does not forward the MC content. Note that a MC path may include a plurality of different types of interconnects. For example, one embodiment may incorporate the internal MC tree discussed hereinabove having a termination point at the PCF, and the external MC tree having a termination point at the PDSN. Similarly, the MC path may include point-to-point tunnels, wherein each tunnel is formed between one node and a distinct individual node.

According to an exemplary embodiment illustrated in FIG. 5, a communication system 300 includes a CS 326 in communication with PDSNs 320 and 322 via an IP cloud 324. Note that CS 326 also communicates with other PDSNs not shown. The IP cloud 324 includes a configuration of routers, such as multi-cast routers (as described hereinabove) and other routers for passing data transmissions through the cloud 324. Transmissions through the IP cloud 324 are IP communications. The routers within the IP cloud 324 accesses communications, such as BC messages and MC messages, to target recipients consistent with the Internet Engineering Task Force (IETF) protocols.

Continuing with FIG. 5, the PDSN 320 and 322 are in communication with PCFs 310 and 312, as well as other PCFs not shown, via another IP cloud 314. The IP cloud 314 includes a configuration of routers, such as multi-cast routers and other routers for passing data transmissions through the cloud 314. Transmissions through the IP cloud 314 are IP communications. The routers within the IP cloud 314 accesses communications, such as BC messages and MC messages, to target recipients consistent with the Internet Engineering Task Force (IETF) protocols. Further, the PCF 310 communicates with the BSC 304 via still another IP cloud 308. The IP cloud 314 includes a configuration of routers, such as Multi-cast routers and other routers for passing data transmissions through the cloud 314. Transmissions through the IP cloud 314 are IP communications. The PCF 312 also operates as a BSC and is in communication with any of the users within system 300 (not shown). Note that for clarity three BSCs are illustrated, specifically, BSCs 302, 304 and 306. The system 300 may include any number of additional BSC (not shown). Note that alternate embodiments may incorporate alternate configurations, wherein any or connections indicated by the multiple IP clouds, such as IP clouds 308, 314, 324, may be replaced with point-to-point connections. A point-to-point connection may be a secure connection made between the apparatus at one point, such as at a PCF, to another point, such as a BSC. The point-to-point connection is achieved over an IP cloud, such as IP cloud 308, using the method called tunneling. The basic idea of tunneling to take an IP packet, encapsulate the packet in GRE/IP and send the resultant packet to a destination point. If the destination address of the outer IP header is a uni-cast IP address, the process achieves a point-to-point tunnel. If the destination address is a multi-cast IP address, the process achieves a point-to-multipoint tunnel. Note that all these are done in the same IP cloud. For example, in IP cloud 314, there are several different applicable methods. One method forms a point-to-point tunnel, and a second method forms a point-to-multipoint tunnel. This is contrasted with the connection method used in cloud 324, wherein no GRE tunneling is used and the original multi-cast IP packet is transmitted.

In the exemplary embodiment, the CS 326 configures an HSBS channel with knowledge of a multi-cast IP address to be used in the IP cloud 324. The CS uses the MC IP address to send the HSBS content information, referred to as the payload. Note that the configuration of FIG. 8 may be used to broadcast a variety of BC services.

To form a tunnel, the message is encapsulated within an external IP packet. As the encapsulated message transmits through the tunnel, the internal IP address, i.e., IP address of the original IP packet, is ignored. The encapsulation changes the Internet routing of the original IP packet. In the exemplary embodiment, the MC tunnel routes the BC or MC message through the MC tree between PDSN and PCF.

In the exemplary embodiment, the PDSN 320 and the PCFs 310 and 312 are associated with an MC group. In other words, MC group members are located within cells, sectors, and/or geographical areas serviced by the PCFs 310 and 312. The system 300 builds an external MC tree from the CS 326 to the PDSN 320 and an internal tree from the PDSN 320 to PCFs 310 and 312. The PDSN 320 builds the external MC tree by successively registering with neighboring Multi-cast routers within the IP cloud 324. The external MC tree is built from the PDSN 320 to the CS 326 through the IP network. The PDSN 320 receives the MC message(s) for MC group members via the external MC tree. In other words, MC messages are sent through the external MC tunnel structured by the external MC tree. Each of the PCFs 310 and 312 builds an internal MC tree to the PDSN 320 through the IP cloud 314. The MC message(s) from the PDSN 320 are sent over an internal MC tree in a GRE/IP tunnel.

FIG. 6 illustrates a MC tree 400 having a source 402 and multiple routers 404 to 450. The source 402 is the base of the MC tree 400. The end users 412, 414, 420, 422, 424, 434, and 450 are considered leaves of the MC tree 400. Two main branches are formed via routers 404 and 406. On the first main branch is another branch through router 410. On the second main branch are two subsequent branches: one through 430 and another through 432.

In one embodiment, the tree 400 has a CS as a source. For a broadcast service wherein the broadcast message originates at the CS, the source 402 is a CS. In an alternate embodiment, the source may be another apparatus in the network. For example, for a group call service the message content may originate with another user, wherein the BSC associated with that user is the source of the MC tree. Additionally, there may be a group call manager function in the network that receives messages from a member then forwards the messages through the MC tree to the Group Call members. In each of these cases, the tree provides a pathway for providing same information content to multiple users while conserving bandwidth and avoiding redundant duplication and processing of information. As another example, in a Many-to-Many (M-to-M) MC application, wherein any number of hosts send to the same MC group address, as well as receiving therefrom, the BSC associated with the user originates the MC content as the source of the MC tree. Additionally, there may be a MC application that has network entity that receives messages from a member and then forwards the messages through the MC tree to the MC group members.

Figure 7:
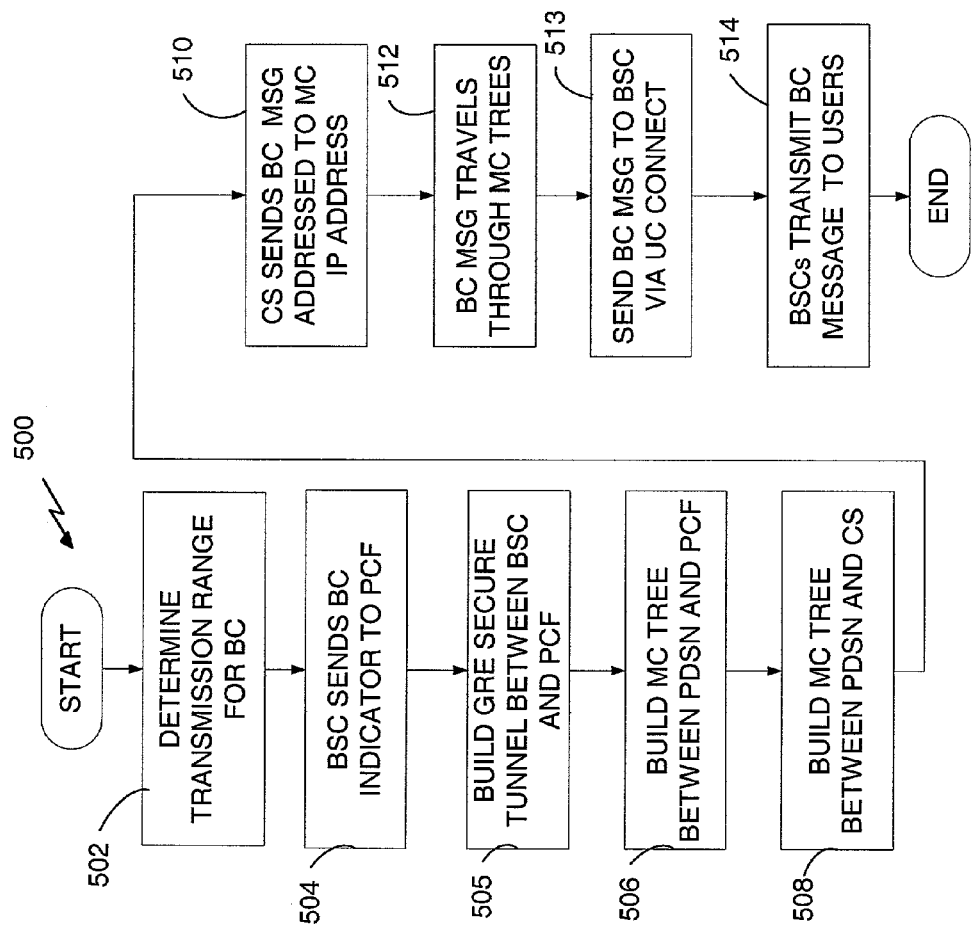
FIG. 7 is a flow diagram of broadcast processing in a wireless communication system incorporating multi-cast Internet Protocol transmissions.

FIG. 7 illustrates a method 500 for processing BC messages according to one embodiment. The process 500 builds a MC tree between at least one BSC and a PCF. The tree may include multiple BSCs. Similarly, additional trees may be built for additional PCFs. The MC tree forms a path for sending a BC message to multiple recipients without setting up point-to-point connections. The process 500 also builds a MC tree between at least one PCF and a PDSN. The tree may include multiple PCFs and one PDSN, wherein according to one embodiment, one internal multi-cast tree may flow through only one PDSN, i.e., there is only one base per tree). Additionally, the process 500 builds another MC tree between at least one PDSN and a CS. The tree may include multiple PDSNs.

The broadcast service of the embodiment illustrated in FIG. 7 is the broadcast of a BC message to a transmission range. At a first step 502 the process 500 determines the transmission range of cell(s), sector(s), and/or geographical area(s) for transmission of the BC message. The transmission range information is used to build an MC tree. Specifically, identification of the transmission range identifies the leaves of the MC tree. The MC tree is built from the leaves to the base. The BSC sends a broadcast indicator to the PCF at step 504. The broadcast indicator is a signaling message to alert the PCF that the BSC wants to receive the broadcast. The process then builds a first connection between the BSC(s) of the transmission range and the associated PCF(s) at step 505. The connection is a GRE secure tunnel between each BSC and PCF pair. The process then builds a MC tree between the PDSN and the PCF at step 506. The transmission range identifies the PCF(s) for BC transmission. Each PCF within the transmission range initiates the MC tree by registering with a neighboring Multi-cast router. According to the exemplary embodiment, the process then builds another MC tree from the PDSN(s) to the CS at step 508. At step 510 the CS sends the BC message to the PDSN(s), wherein the BC message is encapsulated in a MC IP packet. The MC IP packet is addressed to the MC IP address and identifies the CS as the source of the packet. The MC IP packet address indicates delivery to any of the PDSN in the MC tree between the PDSN(s) and the CS. At step 512 the BC message traverses the MC trees. The BC message is then sent to the BSC via the secure tunnel or UC connection at step 513. The BSCs transmit the BC message to users in respective coverage areas at step 514.

Note that at this point, to accommodate soft handoff, the receiving BSC may be used as an anchor BSC to timestamp the BC message and then forward it to neighboring BSC(s). In this way, the BC message is transmitted from multiple BSCs to a given user, allowing the user to transition to a better connection without losing the transmission. Additionally, the use of an anchor BSC provides efficiency as the PCF only transmits the BC message to one BSC, but the message may be provided to multiple other BSCs.

Figure 8:
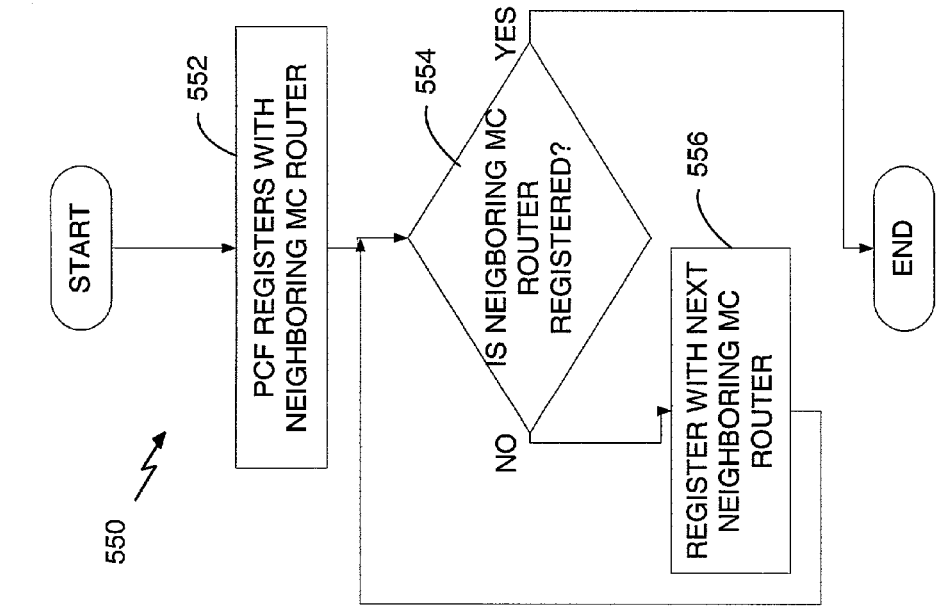
FIG. 8 is a flow diagram of a process for building a multi-cast tree in a communication system.

FIG. 8 illustrates the process 550 of building an MC tree from a PCF to a PDSN. At step 552 the PCF registers with the next neighboring Multi-cast router. The registration with the Multi-cast router initiates a registration chain, wherein each member of the chain registered with the next successive router. The registration with the Multi-cast router further involves identifying the registering PCF as a member of a given MC group and a target of any IP packets addressed to the MC IP address of the MC group. Note that for a BC message, the MC group may be considered the target range. At decision diamond 554 if the Multi-cast router is registered, the process ends as the MC tree is complete. If the Multi-cast router is not registered, i.e., not part of the MC tree, the Multi-cast router registers with the next successive neighboring Multicast router at step 556.

Figure 9A:
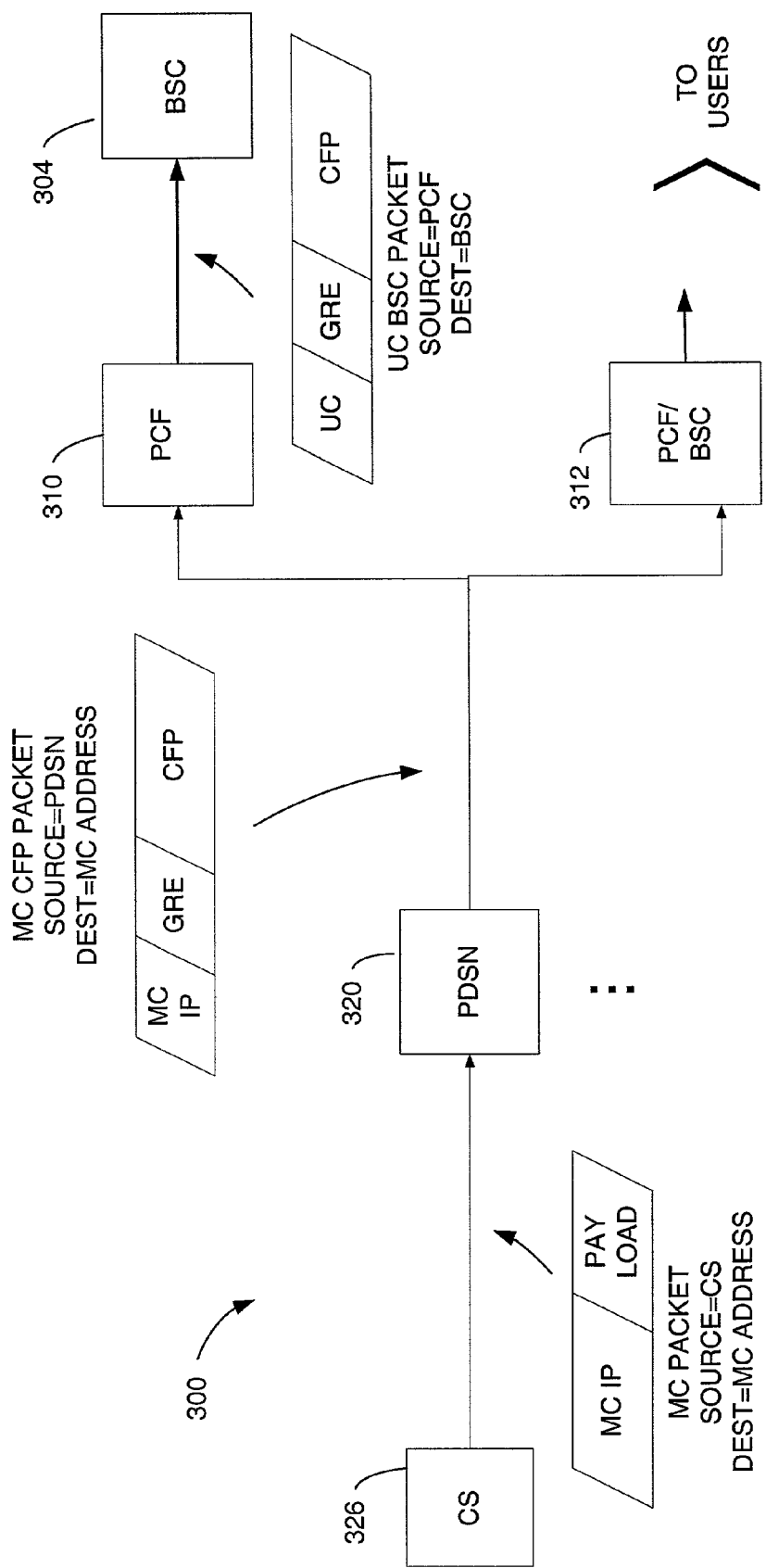
FIG. 9A is a flow diagram of multi-cast processing of a broadcast message in a wireless communication system.
Figure 9B:
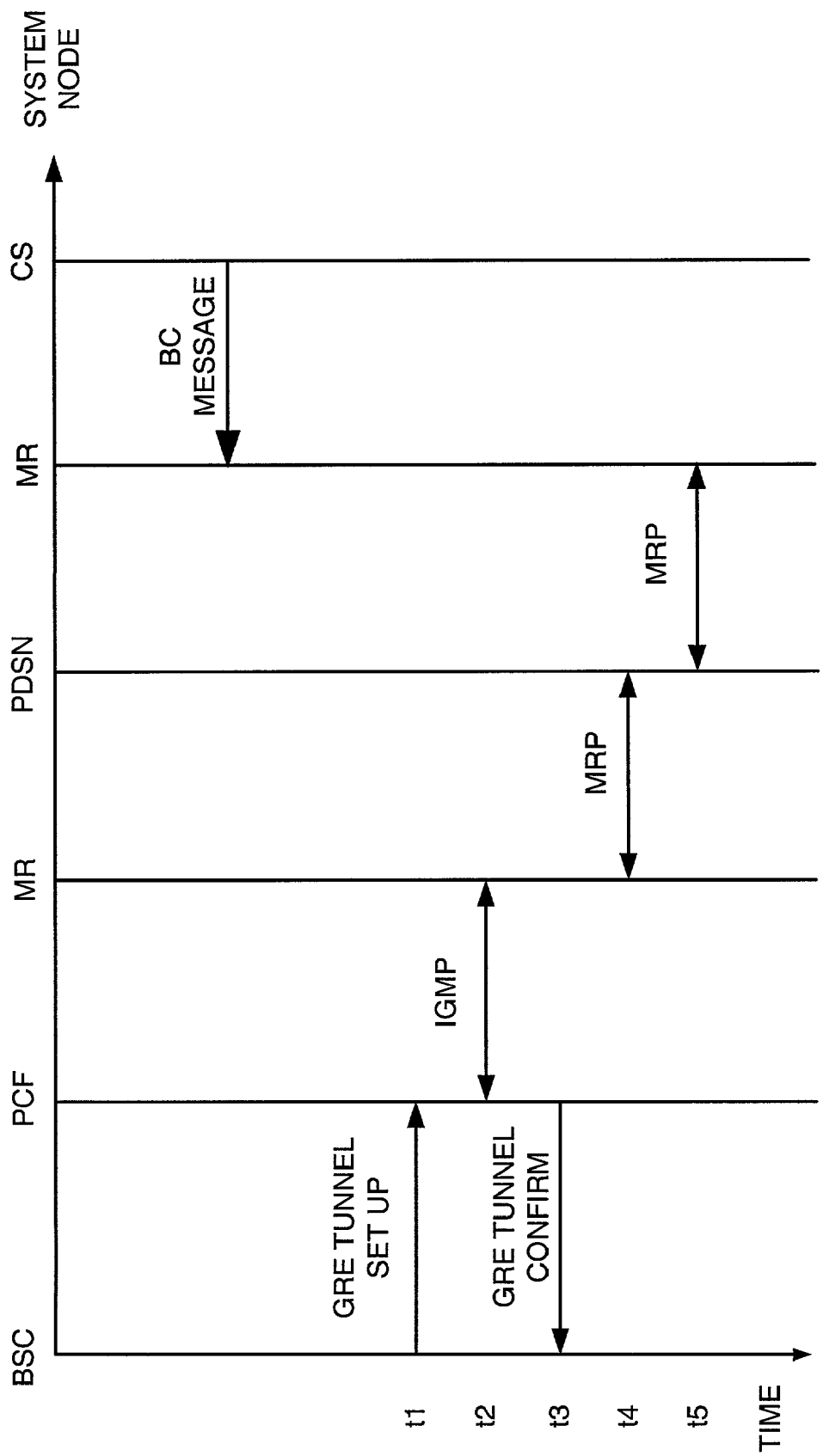
FIG. 9B is a signal flow diagram of setting up a data path in a wireless communication system using a multi-cast Internet Protocol.

FIG. 9A illustrates the flow of a BC message through multiple MC trees, as described in the process 500 of FIGS. 7 and 8. FIG. 9B illustrates the corresponding signal flow of information, i.e., broadcast message processing. As illustrated in FIG. 9A, the BC message originates at the CS 326. The original message is considered the payload. The CS 326 encapsulates the payload by applying a MC IP to generate a MC IP packet. The MC IP packet indicates the CS is the source of the packet and the destination is given as the MC IP address. The MC IP packet is sent to the next router hops on the tree. In other words, the MC IP packet traverses the tree from the source or root of the tree outward toward the leaves. For clarity, a single PDSN is illustrated, specifically PDSN 320, however, the MC tree may include any number of PDSNs each traversed by messages addressed to the MC IP address. The PDSN 320, and any other PDSN in the MC tree, compress the MC IP packet and apply a framing protocol, such as HDLC, to form a Compressed Framed Packet (CFP). The CFP is then encapsulated by a GRE protocol to form a GRE packet. The resulting GRE packet is further encapsulated according to a MC IP, resulting in a MC CFP, i.e., multi-cast compressed framed packet. The MC CFP identifies the PDSN 320 as the source and the MC IP address as the destination. In the example illustrated in FIG. 9A, the PDSN 320 passes the MC CFP to PCFs 310 and 312, each part of the MC tree. Each of PCFs 310 and 312 processes the received MC to form secure tunnels to the BSC(s), such as to BSC 304, wherein the resultant packet is a UC BSC packet identifying the respective PCF as the source and the BSC IP address as the destination. Note that each PCF may form multiple tunnels to individual BSCs. As illustrated, the MC IP addressing is used until the message arrives at the PCF. From the PCF to the end user, this embodiment uses secure tunnels or UC connections.

FIG. 9B illustrates the corresponding signal flow, wherein the CS initially sets up a HSBS channel. At time t1 the GRE tunnel is set up between the BSC and the PCF. At time t2 the PCF registers with the neighboring Multicast router using IGMP. At time t3 the PCF confirms the GRE tunnel set up with the BSC. At time t4 a MC Routing Protocol (MRP) is used to register Multi-cast routers between the PCF and the PDSN. At time t5 the PDSN registers with the neighboring Multi-cast router. The process forms the external portion of the MC tree. Each of the levels of the MC tree, i.e., CS to PDSN, and PDSN to PCF, may be considered an individual MC tree or the entire structure from CS to PCF may be considered one tree. At this point the BSC is setup to receive BC messages via MC IP from the BC CS for the given HSBS channel.

Figure 10:
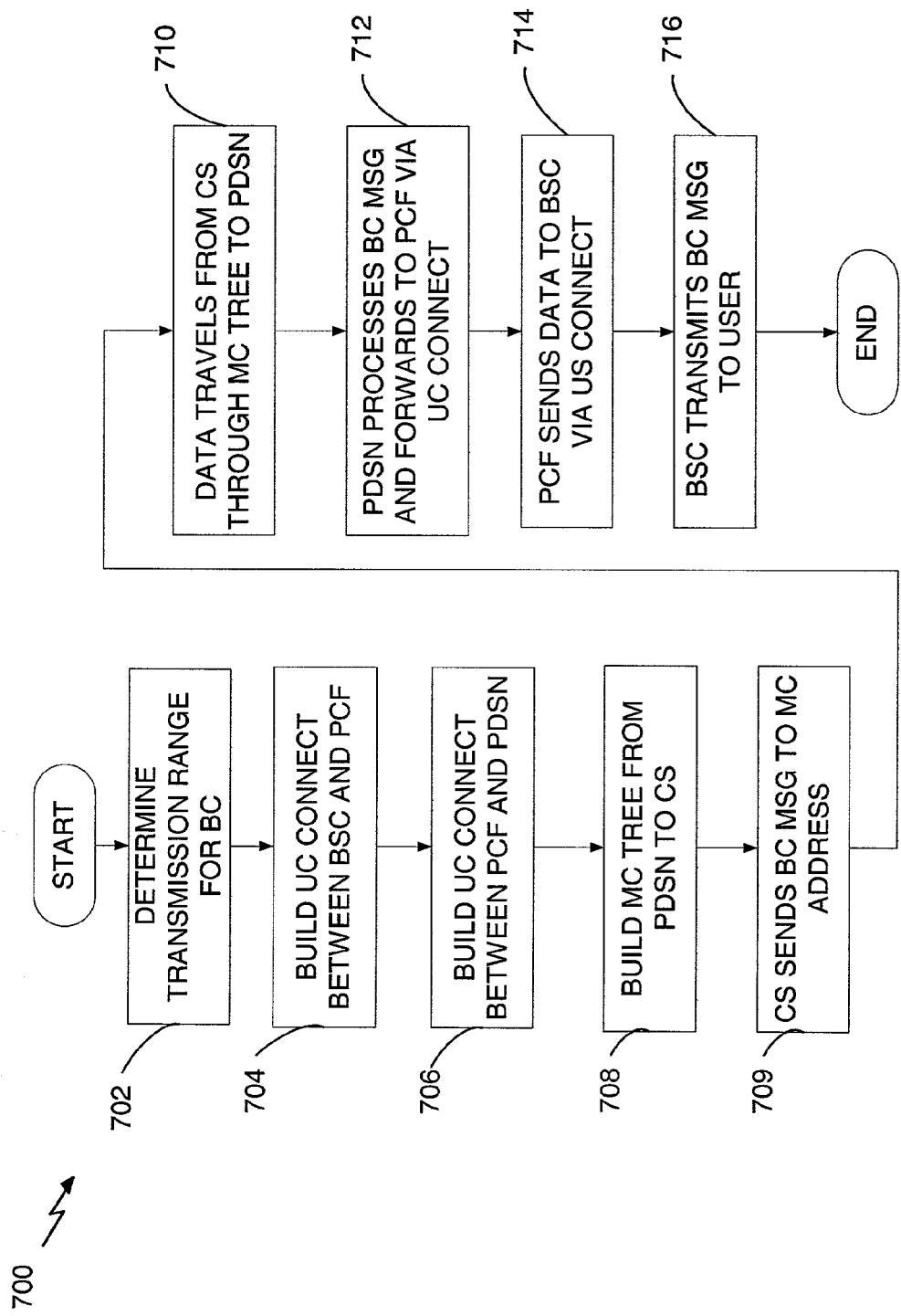
FIG. 10 is a flow diagram of multi-cast processing of a broadcast message in a wireless communication system.

FIG. 10 illustrates an alternate embodiment of a process 700 for transmitting a BC message. The process starts by determining the transmission range of the broadcast at step 702. At step 704 a UC connection is set up between the BSC and the PCF. The UC connection may be an A8/A9 IP connection. Similarly, a UC connection is set up between the PCF and the PDSN at step 706. In contrast to the process 500 of FIG. 10, no MC tree is built between the PDSN(s) and PCF(s). Rather, a point-to-point GRE Tunnel is formed to between each PDSN and PCF pair. The PDSN to PCF UC connection may be an A10/A11 IP connection. At step 708, a MC tree is built between the CS and the PDSN.

The CS then sends data to the PDSN(s) that are part of the MC tree at step 709. The data travels through the MC tree to the PDSN at step 710. The PDSN then processes the received data or BC message and forwards the BC message to the PCF at step 712. Note that when multiple PCFs are implemented, the PDSN creates multiple copies of the data for transmission to multiple PCFs. The PCF sends the data to the BSC via a UC connection at step 714. The data or BC message is then transmitted from the BSCs associated with the MC group to group members at step 716

Figure 11A:
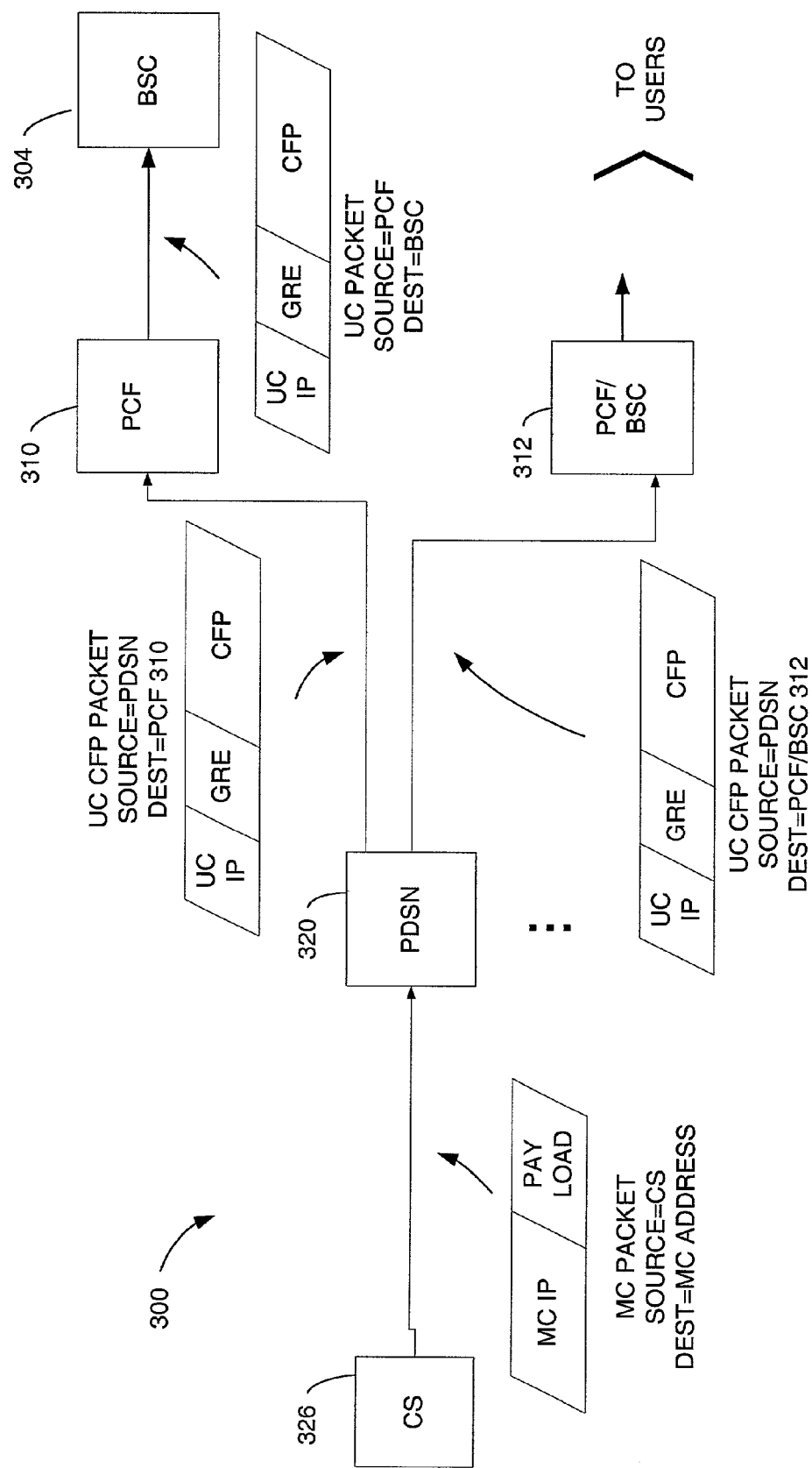
FIG. 11A is a flow diagram of multi-cast processing of a broadcast message in a wireless communication system.
Figure 11B:
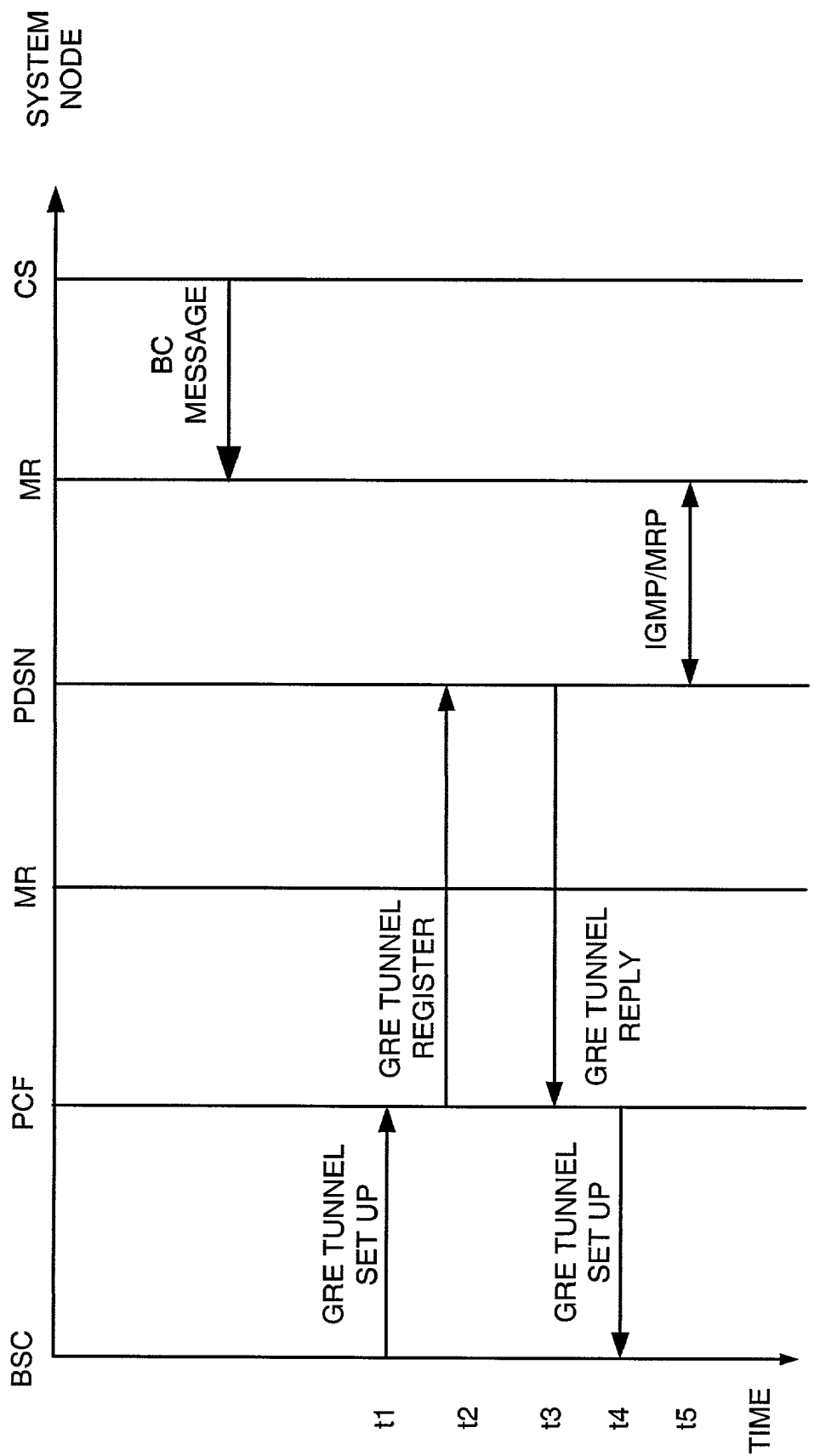
FIG. 11B is a signal flow diagram of broadcast processing in a wireless communication system using a multi-cast Internet Protocol.

FIG. 11A illustrates the flow of a BC message through multiple MC trees, as described in the process 700 of FIG. 10. FIG. 11B illustrates the corresponding signal flow of information, i.e., broadcast message processing. In contrast to process 500 of FIG. 7, the process 700 builds a MC tree between the CS and the PDSN(s), but incorporates point-to-point secure tunnels between the PDSN(s) and PCF(s), as well as between the PCF(s) and individual BSC(s). The user of point-to-point connections provides additional security at the expense of processing and bandwidth considerations.

As illustrated in FIG. 11A, the BC message originates at the CS 326. The original message is considered the payload. The CS 326 encapsulates the payload by applying a MC IP to generate a MC IP packet. The MC IP packet indicates the CS is the source of the packet and the destination is given as the MC IP address. The MC IP packet is sent to the next contacts on the tree. In other words, the MC IP packet traverses the tree from the source or base of the tree outward toward the leaves. For clarity, a single PDSN is illustrated, specifically PDSN 320, however, the MC tree may include any number of PDSNs each identified by the MC IP address. The PDSN 320, and any other PDSN in the MC tree, compress the MC IP packet and apply a framing protocol, such as HDLC, to form a Compressed Framed Packet (CFP). The CFP is then encapsulated by a GRE protocol to form a GRE packet. The resulting GRE packet is further encapsulated according to a Uni-Cast (UC) IP, resulting in a UC CFP, i.e., uni-cast compressed framed packet. The UC CFP identifies the PDSN 320 as the source and a specific PCF as the destination. In the example illustrated in FIG. 11A, the PDSN 320 passes the UC CFPs to PCFs 310 and 312. Each of PCFs 310 and 312 processes the received UC CFP in a similar manner to the PDSN 320, wherein the resultant packet is a UC BSC packet identifying the respective PCF as the source and a BSC as the destination.

FIG. 11B illustrates the corresponding signal flow, wherein the CS initially sets up a HSBS channel. At time t1 the BSC sets up the GRE tunnel between the BSC and the PCF. At time t2 the PCF PCF sets up GRE tunnel between PCF and the PDSN. At time t3 the PDSN confirms the GRE tunnel set up with the PCF. At time t4 the PCF confirms GRE tunnel set up with the BSC. At time t5, the PDSN uses IGMP or MRP to join a multi-cast group. Note that the initial processing may implement IGMP to the first router. The process forms the MC tree between the CS and the PDSN. At this point the BSC is setup to receive BC messages via MC IP from the BC CS for the given HSBS channel.

According to one embodiment, for BC service processing, the CS configures an HSBS channel using a local mechanism. The CS uses the MC IP address to send the HSBS content. The HSBS configuration results in the CS sending HSBS content to the corresponding MC group. The content is sent in the format of IP packets having the source IP address of the CS and the destination IP address as a MC IP address.

The BSC then decides to add an HSBS channel on a given broadcast channel. The broadcast channel is to be transmitted over a set of cells/sectors. The mechanism in the BSC to add an HSBS channel to a broadcast channel is implementation-specific. One example of such a mechanism is an interface that enables HSBS channel configuration on the BSC, such as an Operation Administration & Management (OA&M) interface. The BSC uses the local mechanism to setup the HSBS channel, using information such as the HSBS_ID of the HSBS channel and the MC IP address corresponding to the HSBS content.

The BSC sends an A9-Setup-A8 message to the PCF. In the A9-Setup-A8 message, the BSC sends A8_Traffic_ID parameter that contains among other things, the GRE key, and the IP address of the BSC entity that terminates the A-8 connection for the HSBS channel. An additional field, IP_Multi-castAddress, is added to the A8_Traffic_ID parameter. The additional field identifies an IP multi-cast address that is used by the CS to transmit the HSBS content. A new service option for HSBS service is used in the A9-Setup-A8 message.

Upon receiving the A9-Setup-A8 message from the BSC, the PCF is alerted that the BSC wants to join an IP multi-cast group. If the PCF is already a member of the desired multi-cast group then no further action may be necessary to join the multi-cast group. Otherwise, the PCF sends an IGMP request to its multi-cast router to join the multi-cast group. Upon successful IGMP setup, the PCF sends the A9-Connnect-A8 message back to the BSC. The multi-cast route information propagates from the multi-cast router using multi-cast routing protocol to the upstream routers, through PDSN all the way to the CS. This sets up a multi-cast path or tree from the CS to the PCF. The PCF achieves binding of GRE A8-Key, BSC IP address and IP Multi-cast address to properly tunnel IP multi-cast packets to a BSC.

There are several multi-cast routing protocols used for multi-cast routing in an IP environment. The Distance Vector Multi-cast Routing Protocol (DVMRP) is specified in RFC 1075 by D. Waitzman, C. Partridge, S. E. Deering on Nov. 1, 1988. The Protocol Independent Multi-cast-Sparse Mode (PIM-SM) is specified in RFC 2362 by D. Estrin, D. Farinacci, A. Helmy, D. Thaler, S. Deering, M. Handley, V. Jacobson, C. Liu, P. Sharma, L. Wei in June 1998. There is also Multi-cast Open Shortest Path First (MOSPF), specified in RFC 1584 entitled "Multi-cast Extensions to OSPF." By J. Moy in March 1994.

Continuing with FIG. 11B, a GRE connection is set from the BSC to the PCF, wherein a GRE tunnel set up message is sent, such as illustrated at time t1 of FIG. 11B. In the GRE set up message, the BSC sends a Traffic_ID parameter containing, the GRE key, and the IP address of the BSC entity terminating the connection for the HSBS channel. The IP_Multi-castAddress, is added to the Traffic_ID parameter. The Traffic_ID parameter may include a variety of other information. The IP_Multi-castAddress identifies an IP MC address used by the CS to transmit the HSBS content.

In operation, the CS sends the HSBS content, e.g., BC message, to a MC IP address. The MC IP address is used in the destination address field of the IP packets. The multi-cast router routes the packet to member PDSN(s). Note that the multi-cast group membership is established earlier using IGMP and MC routing protocol. After header compression (if it is performed), PDSN places each packet in an HDLC frame. The HDLC frame is encapsulated in a GRE/IP packet. The PDSN sets the Key field of the GRE packet to the destination MC IP address of the encapsulated IP packet. The GRE packet is appended with the 20-byte IP packet header having source address field of the PDSN IP address and destination address field of the same MC IP address as the encapsulated packet. The PDSN sends the encapsulated HDLC frame to the member Multi-cast router(s). All multi-cast member PCFs receive the MC packets. The need for sequencing is due to the header compression in the PDSN. The GRE includes sequence numbers identifying packets. The GRE sequence numbers ensure in-order delivery of packets.

Multiple BSCs may be used to broadcast a same HSBS channel to cover a certain geographic area. In this case, the HSBS channel is associated with a specific frequency. To facilitate autonomous soft hand off, transmission of the Fundamental Broadcast Service Channel or F-BSCH is synchronized in a geographic area. This allows for combining of broadcast packets at the mobile station. According to one embodiment the MC tree includes a leaf referred to as an "anchor BSC" that duplicates the broadcast content to the secondary BSC. The anchor BSC will duplicate and send the HDLC frames to any secondary BSC(s) over a specific interface, wherein the transmission to the secondary BSC(s) have a constrained delay.

Figure 12:
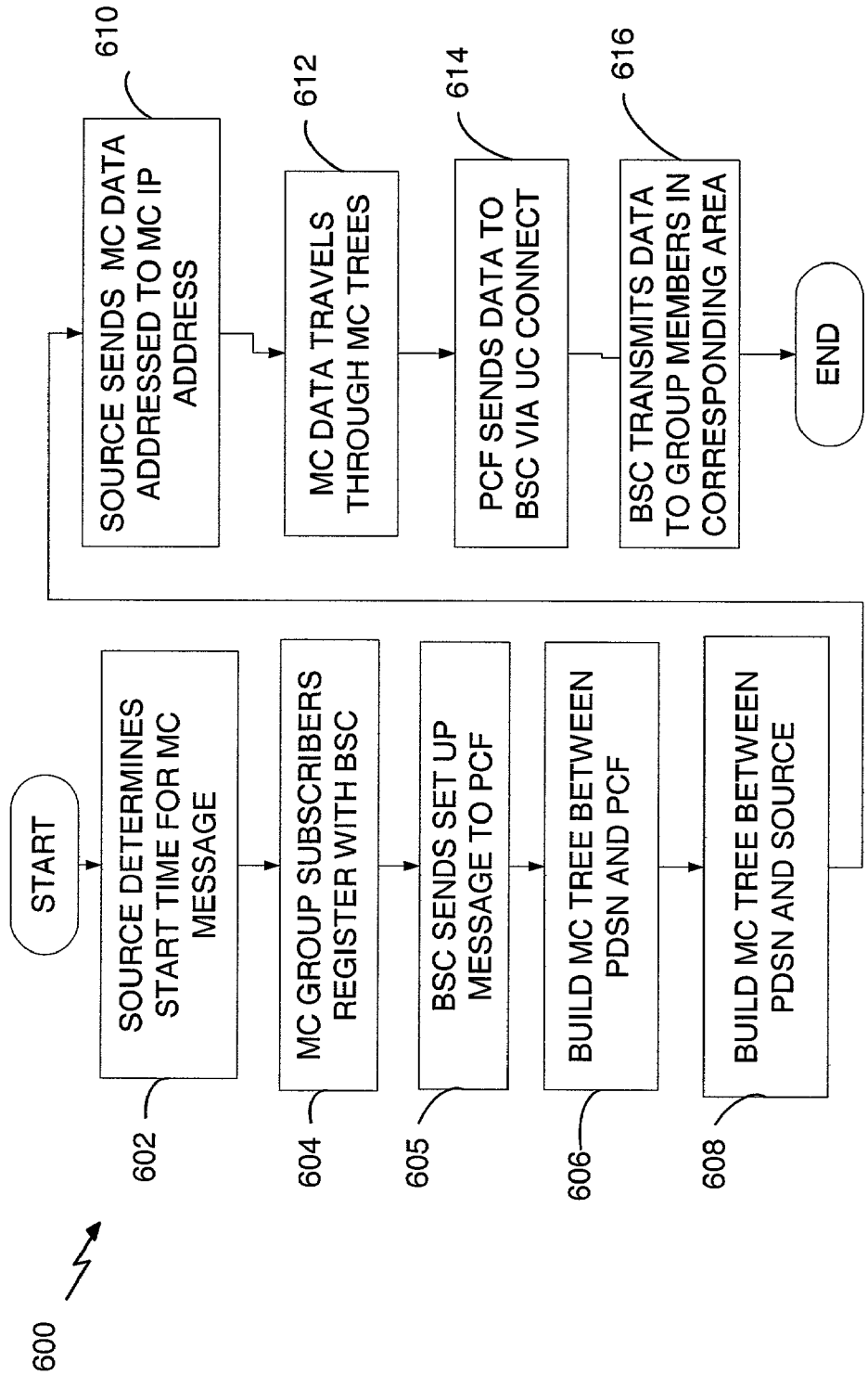
FIG. 12 is a flow diagram for a message flow for a group call service in a wireless communication system topology.

FIG. 12 illustrates a method of processing of a MC message is transmitted to a MC group. The process is for a Group Call service, wherein the message to be broadcast may originate with a user in the system. The group call allows a user to provide point-to-multipoint transmission. One user in the group transmits a message for multiple intended recipients. The process 600 begins at step 602 wherein the CS determines a start time for the MC message. The MC group subscribers register with the BSC at step 604. At step 605 the BSC sends a set up message to the PCF. The set up message initiates the formation of a GRE tunnel between the BSC and PCF, while also alerting the PCF that the BSC is part of the Group Call. The process builds an MC tree at step 606 between the PDSN and the PCF(s). The process then builds an internal MC tree form the PDSN to the CS at step 608. Once the MC trees are set up the source sends the MC message addressed to the MC IP address at step 610. The message travels through the trees at step 612. The PCF transmits the MC message to the BSC via a UC connection at step 614. The BSC then forwards the MC message to the group members within the corresponding geographical area at step 616.

Note that for a MC message transmitted to a MC group, the group members move within the communication system. When a group member moves to a location that is not registered within the MC tree or is not part of the MC message transmission, the group member registers with the BSC of the new location. During a group call, the group member will be monitoring the frequency assigned to the BC channel used for the group call. By registering with a new BSC, the group member provides the system with the frequency of the BC. The system is then able to page the group member of an incoming call. Once the group member registers with a new BSC, the system creates a new MC tree that includes the new BSC.

Figure 13:
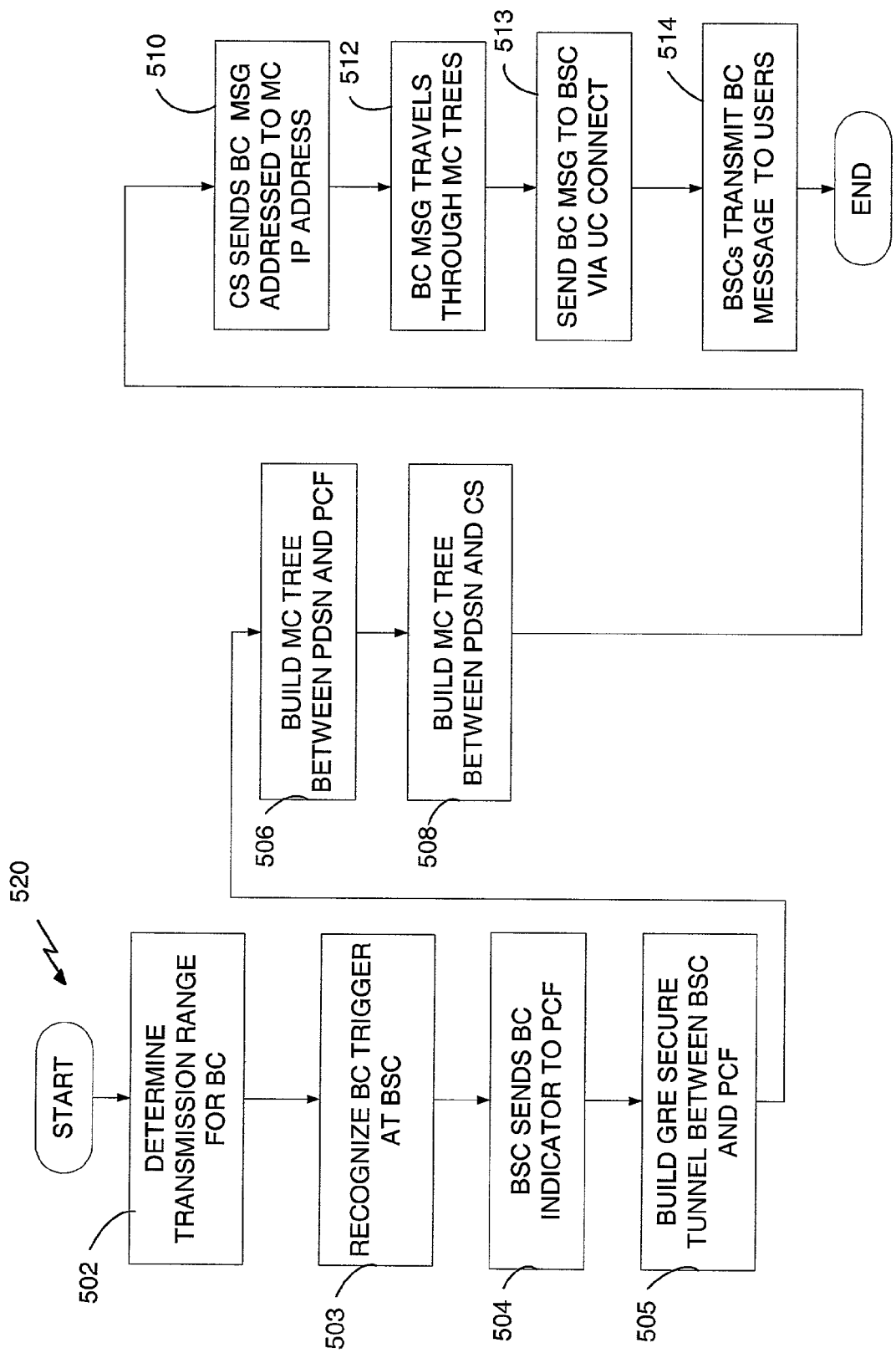
FIG. 13 is a flow diagram for broadcast processing in a wireless communication system incorporating multi-cast Internet Protocol transmissions.

FIG. 13 illustrates, in flow diagram form, a method for processing a broadcast message or a group call in a system supporting broadcast messages and group call messages having a broadcast channel. The process 520 is similar to the process 500 of FIG. 7, wherein the BSC (or other element involved in a wireless transmission of messages) identifies a BC trigger event. The BC trigger event may be a request from one or more mobile stations or other wireless apparatus supported by the BSC. For example, in the system 200 illustrated in FIG. 2, the BSC may receive a request for a BC message from one or more of mobile stations 206. Other triggers may involve a request from another BSC for BC service. Still time may provide a trigger, wherein at a predetermined time, the BSC initiates a BC transmission. The BC is not transmitted to a given BSC until the BSC recognizes a BC trigger and in response requests the BC message.

Continuing with FIG. 13, process 520 begins at step 502 where the system determines a BC range. The BSC then recognizes a BSC trigger at step 503, wherein processing continues from step 504 as described with respect to process 500 of FIG. 7.

Figure 14:
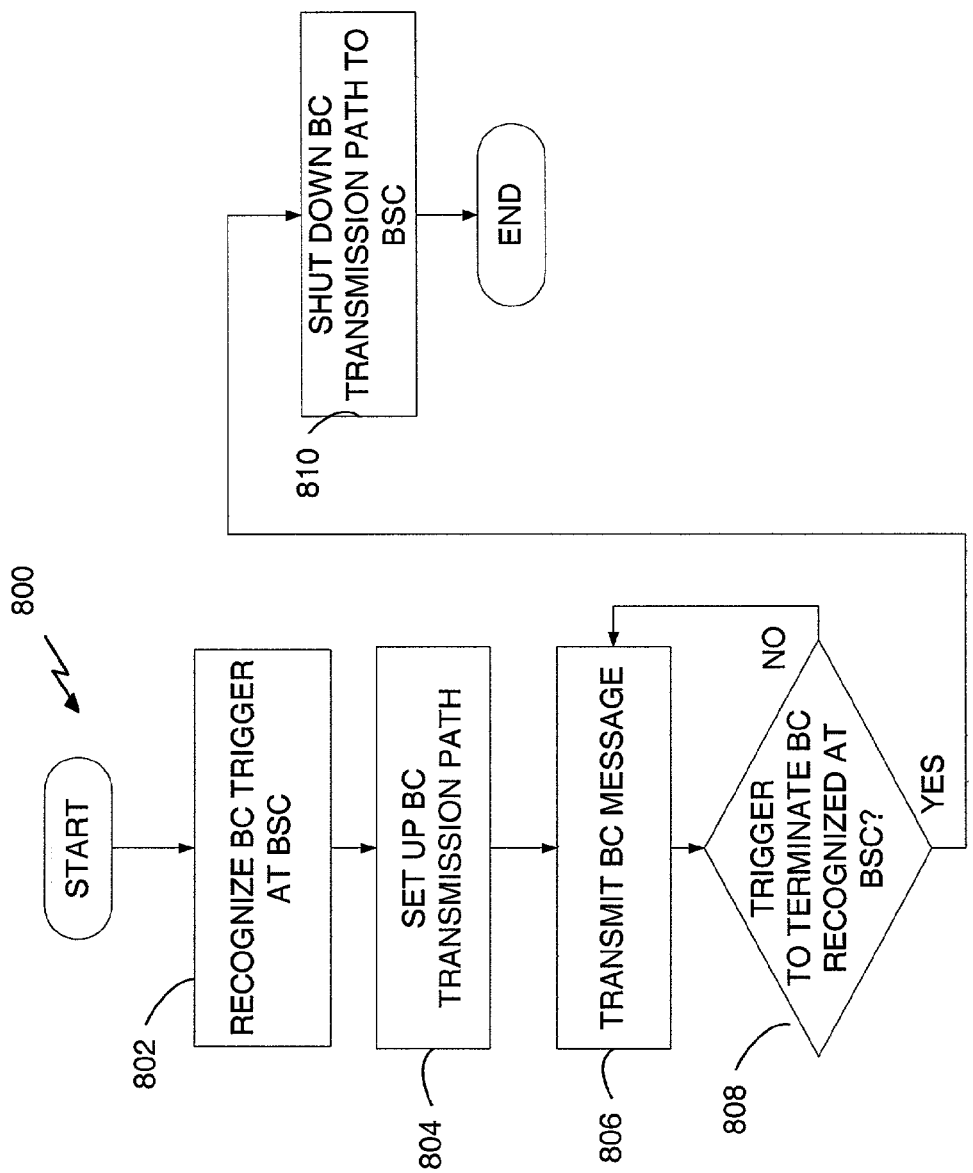
FIG. 14 is a flow diagram for providing interim broadcast processing in a wireless communication system.

As discussed hereinabove, the BC transmission is not provided to a given BSC until the BSC recognizes a trigger, requests a BC in response. The system then sets up the path from a content server to the requesting BSC. FIG. 14 illustrates the process for setting up and shutting down a BC transmission path. The dynamic transmission of the BC message may be referred to as "intermittent broadcast," wherein the intermittent BC is provided by a process of setting up and shutting down a BC transmission path. As illustrated in FIG. 14, a process 800 begins when the BSC, or other air interface transmitter, recognizes a BC trigger. The trigger may be a request for BC service from a mobile station or other wireless apparatus, or may be based on a time scheduler or other predictable event. For example, in one embodiment a given BC message, such as a stock quote update, may be transmitted each afternoon at the close of the stock exchange. In an alternate embodiment, news alerts are broadcast on a real-time occurrence. At step 804 the BC transmission path is set up through the network. The set up of a path may be as described hereinabove. The content server then provides the BC message at step 806. Upon recognition of termination trigger at decision diamond 808, the process shuts down the BC transmission path to a given BSC. The termination trigger event may be expiration of a time interval. Alternately, the termination trigger may be the absence of requests from mobile station(s) previously receiving the BC service.

In one embodiment, a multi-cast application wherein a single host sending to two or more receivers is referred to as One-to-Many or 1-to-M. One example of this type of a multi-cast application may be referred to as a group call. One embodiment of a group call is processed in a system 1000 illustrated in FIGS. 15A and 15B. The system 1000 at a first time is illustrated in FIG. 15A, wherein multiple mobile stations 1004 have requested a group call service from the BSC 1002. In this case, the BSC 1002 determines that the number of users desiring the service is less than a predetermined threshold, and therefore, the BSC 1002 transmits to each of the mobile station 1004 on dedicated channel 1 and transmits the group call message to mobile station 1006 on a distinct dedicated channel 2. Note that the dedicated channels may be identified by different frequencies or may be code separated, such as in a CDMA or other spread spectrum type system.

Figure 15B:
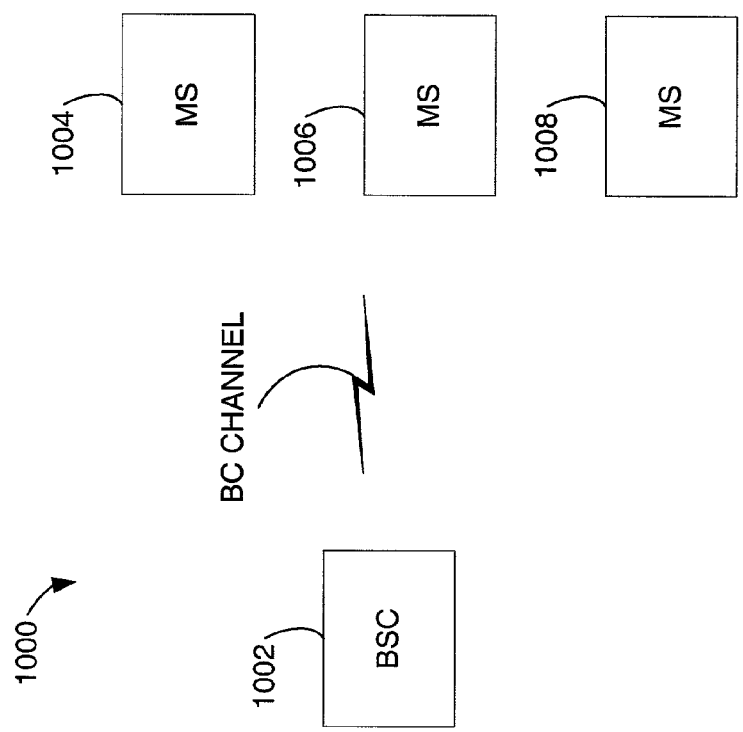
FIGS. 15A and 15B illustrate group call operation in a wireless communication system.
Figure 15A:
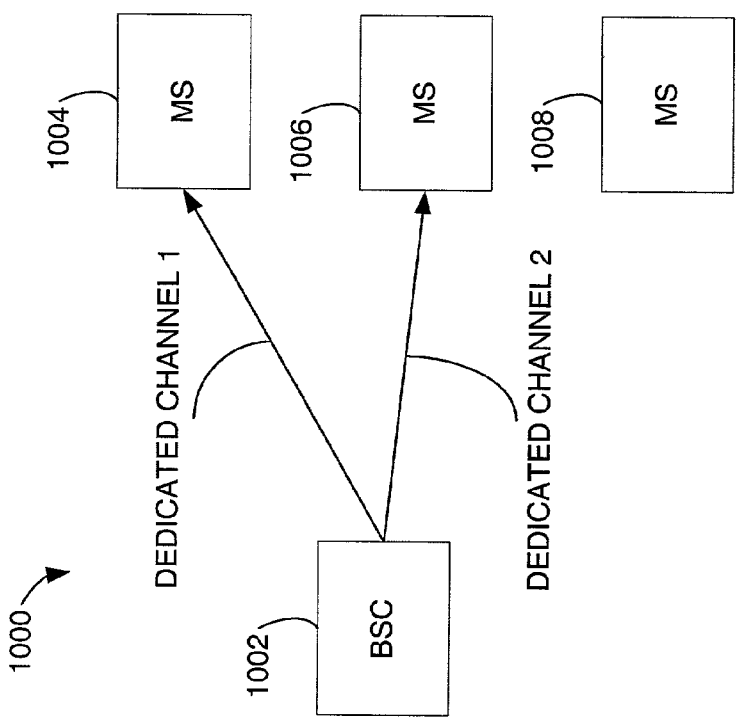

At a second time, illustrated in FIG. 15B, the number of mobile stations requesting the group call service exceeds a predetermined threshold, and therefore, the BSC 1002 determines to transmit the group call message on a predefined BC channel. Each of the mobile stations 1004, 1006, and 1008 are informed of the transmission channel prior to sending the group call message.

Figure 16:
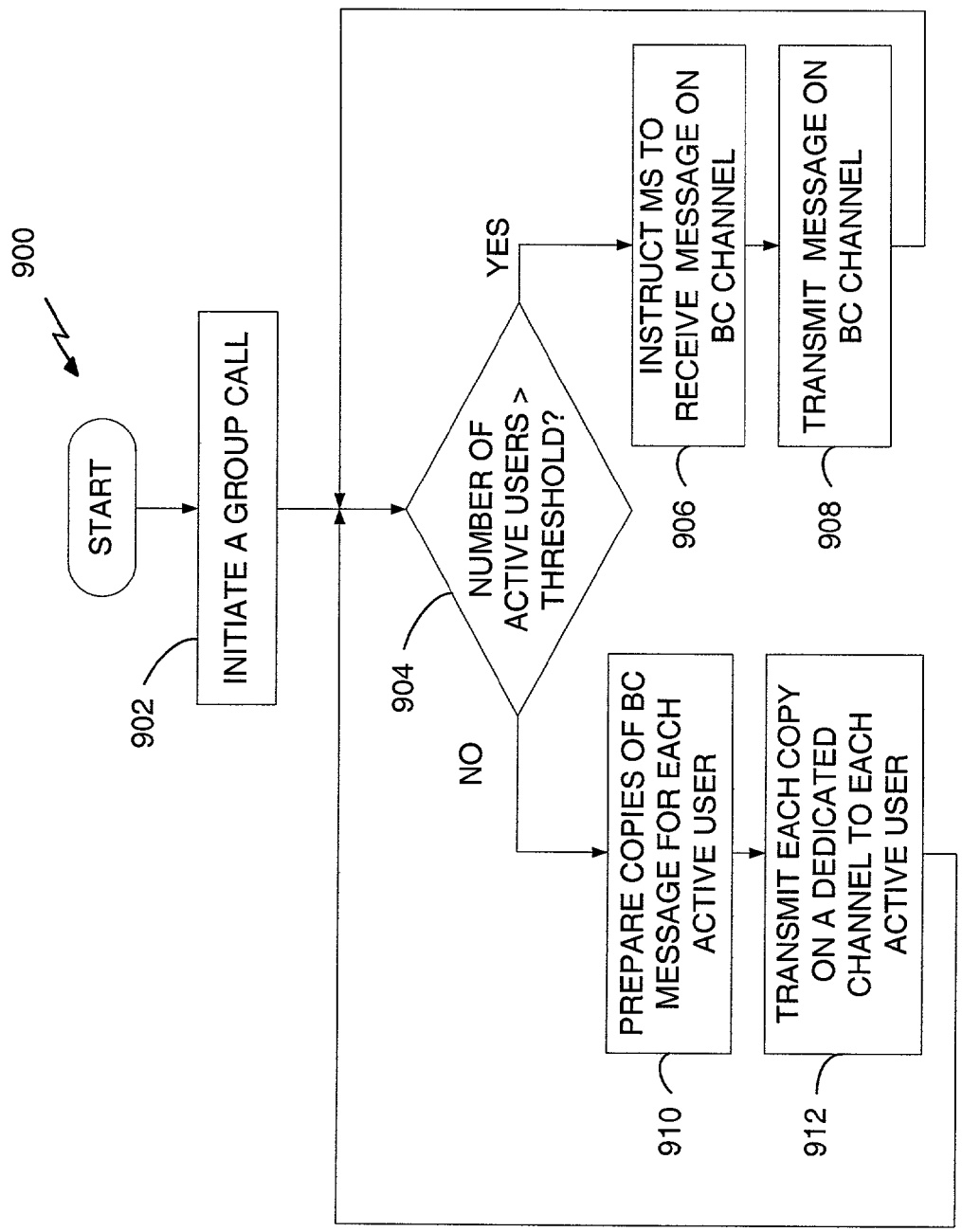
FIG. 16 is a flow diagram illustrating group call operation in a wireless communication system.

A method 900 for processing group calls is illustrated in FIG. 16. A group call is initiated at step 902. The BSC determines if the number of active users, i.e., number of mobile stations or other wireless apparatus desiring to participate in the group call, is greater than a predetermined threshold at decision diamond 904. The threshold may be determined statically and defined for a given system, configuration, or wireless transmitter apparatus. Alternately, the threshold may be dynamically adjusted based on the processing of the group call and operation of the system. If the number of active users exceeds the threshold, processing continues to step 906 to provide instructions to each of the mobile stations that the group call will be transmitted on a given BC channel.

Continuing with FIG. 16, at step 908 the BSC transmits the group call on the BC channel. Processing returns to decision diamond 904. If the number of active users is not greater than a threshold, processing continues to step 910, wherein the BSC prepares copies of the group call message for each active user. At step 912 the copies are transmitted to each active user on a unique dedicated channel. As discussed hereinabove, the dedicated channels may be defined by distinct carrier frequencies or may be code divided channels.

The group call illustrated in FIG. 16 is thus performed over uni-cast channels for a small number of users, and is transmitted over a multi-cast channel as the number of users increases. Alternate embodiments may implement another criteria for deciding whether to use uni-cast channels or multi-cast channel(s), such as based on loading, channel quality, and/or amount of data to be transmitted. The method as in FIG. 16 conserves the transmission resources, including but not limited to the radio resources, by using individual dedicated channels rather than using the broadcast channel, wherein the decision to use a broadcast channel or individual channels is determined by the number and distribution of recipients.

Alternate embodiments may apply the methods discussed hereinabove to alternate BC services, wherein a point-to-multipoint transmission is used. The use of MC trees formed by the leaves or termination points registering with successive routers provides a convenient and dynamic method of avoiding redundancies in the communication system. Additionally, the use of MC trees provides increased scalability reducing the amount of infrastructure required for expanding the network. Note that for group call operation, the system may configure the network up to the transmission node, i.e., air interface transmitter such as BSC, even though the air interface uses dedicated channels. In other words the system applies the multi-cast tree path as described hereinabove on the network side, and applies uni-cast paths to call participants. In this way the BSC receives only one copy from the network.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. In a wireless communication system supporting broadcast transmissions, the system having a broadcast source node and at least one broadcast transmission node, a method comprising:
   selecting a broadcast;
   recognizing a broadcast trigger at the broadcast transmission node;
   establishing a broadcast transmission path for the broadcast to the broadcast transmission node from the broadcast source node;
   sending a unidirectional broadcast message through the broadcast transmission path to the broadcast transmission node, wherein the broadcast message is packet data forming a broadcast session; and
   transmitting the broadcast message from the broadcast transmission node.

2. The method as in claim 1, further comprising:
   recognizing a broadcast termination trigger,
   wherein sending the broadcast message through the broadcast termination path to the broadcast transmission node is terminated in response to recognizing the broadcast termination trigger.

3. The method as in claim 1, wherein broadcast trigger is a request from a wireless apparatus to receive the broadcast message.

4. The method as in claim 1, wherein the broadcast trigger is a time of day.

5. A wireless apparatus in a wireless communication system supporting broadcast transmissions, the system having a broadcast source node and at least one broadcast transmission node, the apparatus comprising:
   means for recognizing a broadcast trigger at the broadcast transmission node;
   means for establishing a broadcast transmission path for the pending broadcast to the broadcast transmission node from the broadcast source node;
   means for sending a unidirectional broadcast message through the broadcast transmission path to the broadcast transmission node, wherein the broadcast message is packet data forming a broadcast session; and
   means for transmitting the broadcast message from the broadcast transmission node.

6. A wireless apparatus, comprising:
   a processing unit;
   a memory storage device coupled to the processing unit, the memory storage device adapted to store a plurality of instructions for;
   selecting a broadcast;
   recognizing a broadcast trigger at the broadcast transmission node;
   establishing a broadcast transmission path for the broadcast to the broadcast transmission node from the broadcast source node;
   sending a unidirectional broadcast message through the broadcast transmission path to the broadcast transmission node, wherein the broadcast message is packet data forming a broadcast session; and
   transmitting the broadcast message from the broadcast transmission node.

7. In a wireless communication system supporting group call transmissions, the system having a source node and at least one transmission node, a method comprising:
   initiating a first group call;
   determining a first number of active users for the group call;
   if the first number exceeds a threshold value, transmitting the group call to all active users on a broadcast channel for the duration of the group call; and
   if the first number does not exceed the threshold value, transmitting the group call to all active users on at least one dedicated channel for the duration of the group call, wherein the at least one dedicated channel allows a point-to-point communication between the at least one transmission node and an active user.

8. The method as in claim 7, wherein transmitting the group call on a broadcast channel comprises:
   instructing active users to receive the group call on the broadcast channel.

9. The method as in claim 7, wherein transmitting the group call on at least one dedicated channel comprises:
   preparing one copy of the group call message for each active user.

10. The method as in claim 7, wherein transmitting the multi-cast call on a broadcast channel comprises:
    instructing active users to receive the multi-cast call on the broadcast channel.

11. The method as in claim 7, wherein transmitting the multi-cast call on at least one dedicated channel comprises:
    preparing one copy of the multi-cast call message for each active user.

12. A wireless apparatus adapted for use in a wireless communication system supporting group call transmissions, the system having a source node and at least one transmission node, the wireless apparatus comprising:
    means for initiating a first group call;
    means for determining a first number of active users for the group call;
    means for transmitting the group call to all active users on a broadcast channel for the duration of the group call if the first number exceeds a threshold value; and
    means for transmitting the group call to all active users on at least one dedicated channel for the duration of the call if the first number does not exceed the threshold value, wherein the at least one dedicated channel allows a point-to-point communication between the at least one transmission node and an active user.

13. In a wireless communication system supporting multi-cast call transmission the system having a source node and at least one transmission node, a method comprising:

initiating a first multi-cast call;

determining a first number of active users for the multi-cast call;

if the first number exceeds a threshold value, transmitting the multi-cast call to all active users on a broadcast channel forte duration of the call; and if the first number does not exceed the threshold value, transmitting the multi-cast call to all active users on at least one dedicated channel for the duration of the multi-cast call, wherein the at least one dedicated channel allows a point-to-point communication between the at least one transmission node and an active user.

14. A wireless apparatus adapted for use in a wireless communication system supporting multi-cast call transmissions, the system having a source node and at least one transmission node, the wireless apparatus comprising:

means for initialing a first multi-cast call;

means for determining a first number of active users for the multi-cast call;

means for transmitting the multi-cast call to all active users on a broadcast channel for the duration of the multi-cast call if the first number exceeds a threshold value; and means for transmitting the multi-cast call to all active users on at least one dedicated channel for the duration of the multi-cast call if the first number does not exceed the threshold value, wherein the at least one dedicated channel allows a point-to-point communication between the at least one transmission node and an active user.

* * * * *